(12) United States Patent
Brandt et al.

(10) Patent No.: US 10,862,902 B2
(45) Date of Patent: *Dec. 8, 2020

(54) SYSTEM AND METHODOLOGY PROVIDING AUTOMATION SECURITY ANALYSIS AND NETWORK INTRUSION PROTECTION IN AN INDUSTRIAL ENVIRONMENT

(71) Applicant: Rockwell Automation Technologies, Inc., Mayfield Heights, OH (US)

(72) Inventors: David D. Brandt, Milwaukee, WI (US); Kenwood Hall, Hudson, OH (US); Mark Burton Anderson, Chapel Hill, NC (US); Craig D. Anderson, Hudson, WI (US); George Bradford Collins, Milwaukee, WI (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 1166 days.

This patent is subject to a terminal disclaimer.

(21) Appl. No.: 15/213,788

(22) Filed: Jul. 19, 2016

(65) Prior Publication Data

US 2016/0330222 A1  Nov. 10, 2016

Related U.S. Application Data

(63) Continuation of application No. 14/681,026, filed on Apr. 7, 2015, now Pat. No. 9,412,073, which is a
(Continued)

(51) Int. Cl.
*H04L 29/06* (2006.01)
*G06N 20/00* (2019.01)
(Continued)

(52) U.S. Cl.
CPC .......... *H04L 63/1416* (2013.01); *G05B 15/02* (2013.01); *G05B 19/4185* (2013.01);
(Continued)

(58) Field of Classification Search
USPC .......................................................... 706/1
See application file for complete search history.

(56) References Cited

U.S. PATENT DOCUMENTS

| 4,200,770 A | 4/1980 | Hellman et al. |
| 4,831,582 A | 5/1989 | Miller et al. |

(Continued)

FOREIGN PATENT DOCUMENTS

| GB | 2368701 A | 5/2002 |
| WO | 0126335 A2 | 4/2001 |
| WO | 01/65322 A1 | 9/2001 |

OTHER PUBLICATIONS

Extended European Search Report for EP Patent Application Serial No. 16153931.7, dated Jul. 12, 2016, 10 pages.
(Continued)

*Primary Examiner* — Michael B Holmes
(74) *Attorney, Agent, or Firm* — Amin, Turocy & Watson, LLP

(57) ABSTRACT

Automation security in a networked-based industrial controller environment is implemented. Various components, systems and methodologies are provided to facilitate varying levels of automation security in accordance with security analysis tools, security validation tools and/or security learning systems. The security analysis tool receives abstract factory models or descriptions for input and generates an output that can include security guidelines, components, topologies, procedures, rules, policies, and the like for deployment in an automation security network. The validation tools are operative in the automation security network,
(Continued)

wherein the tools perform security checking and/or auditing functions, for example, to determine if security components are in place and/or in suitable working order. The security learning system monitors/learns network traffic patterns during a learning phase, fires alarms or events based upon detected deviations from the learned patterns, and/or causes other automated actions to occur.

20 Claims, 21 Drawing Sheets

Related U.S. Application Data continuation of application No. 13/593,037, filed on Aug. 23, 2012, now Pat. No. 9,009,084, which is a continuation-in-part of application No. 10/661,696, filed on Sep. 12, 2003, now Pat. No. 8,909,926.

(60) Provisional application No. 60/420,006, filed on Oct. 21, 2002.

(51) Int. Cl.
*H04L 29/08* (2006.01)
*G05B 15/02* (2006.01)
*G06N 5/04* (2006.01)
*G05B 19/418* (2006.01)

(52) U.S. Cl.
CPC ............ *G06N 5/047* (2013.01); *G06N 20/00* (2019.01); *H04L 63/1408* (2013.01); *H04L 63/1425* (2013.01); *H04L 63/20* (2013.01); *H04L 67/12* (2013.01); *H04L 67/22* (2013.01); *G05B 2219/31151* (2013.01); *G05B 2219/45103* (2013.01)

(56) References Cited

U.S. PATENT DOCUMENTS

| | | |
|---|---|---|
| 4,882,752 A | 11/1989 | Lindman et al. |
| 5,051,837 A | 9/1991 | McJunkin |
| 5,202,997 A | 4/1993 | Arato |
| 5,371,794 A | 12/1994 | Diffie et al. |
| 5,446,903 A | 8/1995 | Abraham et al. |
| 5,535,276 A | 7/1996 | Ganesan |
| 5,539,906 A | 7/1996 | Abraham et al. |
| 5,583,928 A | 12/1996 | Tester et al. |
| 5,604,914 A | 2/1997 | Kabe |
| 5,774,357 A | 6/1998 | Hoffberg et al. |
| 5,796,721 A | 8/1998 | Gretta, Jr. |
| 5,917,840 A | 6/1999 | Cheney et al. |
| 5,923,756 A | 7/1999 | Shambroom |
| 6,023,456 A | 2/2000 | Chapman et al. |
| 6,035,240 A | 3/2000 | Moorehead et al. |
| 6,088,679 A | 7/2000 | Barkley |
| 6,088,804 A | 7/2000 | Hill et al. |
| 6,108,785 A | 8/2000 | Poisner |
| 6,169,981 B1 | 1/2001 | Werbos |
| 6,259,705 B1 | 7/2001 | Takahashi et al. |
| 6,298,445 B1 | 10/2001 | Shostack et al. |
| 6,321,272 B1 | 11/2001 | Swales |
| 6,321,338 B1 | 11/2001 | Porras et al. |
| 6,374,358 B1 | 4/2002 | Townsend |
| 6,418,533 B2 | 7/2002 | Angelo et al. |
| 6,421,571 B1 | 7/2002 | Spriggs et al. |
| 6,542,993 B1 | 4/2003 | Erfani |
| 6,571,141 B1 | 5/2003 | Brown |
| 6,615,258 B1 | 9/2003 | Barry et al. |
| 6,636,721 B2 | 10/2003 | Threadgill et al. |
| 6,732,191 B1 | 5/2004 | Baker et al. |
| 6,735,601 B1 | 5/2004 | Subrahmanyam |
| 6,760,782 B1 | 7/2004 | Swales |
| 6,788,980 B1 | 9/2004 | Johnson |
| 6,842,860 B1 | 1/2005 | Branstad et al. |
| 6,920,558 B2 | 7/2005 | Sames et al. |
| 6,944,761 B2 | 9/2005 | Wood et al. |
| 6,957,348 B1 | 10/2005 | Flowers et al. |
| 6,961,584 B2 | 11/2005 | Leedom, Jr. |
| 6,981,142 B1 | 12/2005 | Gulcu |
| 7,010,590 B1 | 3/2006 | Munshi |
| 7,013,395 B1 | 3/2006 | Swiler et al. |
| 7,020,701 B1 | 3/2006 | Gelvin et al. |
| 7,035,898 B1 | 4/2006 | Baker |
| 7,047,423 B1 | 5/2006 | Maloney et al. |
| 7,058,154 B1 | 6/2006 | Stark et al. |
| 7,089,303 B2 | 8/2006 | Sheymov et al. |
| 7,093,121 B2 | 8/2006 | Barton et al. |
| 7,100,196 B2 | 8/2006 | Fredriksson |
| 7,127,526 B1 | 10/2006 | Duncan et al. |
| 7,139,843 B1 | 11/2006 | Brown et al. |
| 7,162,534 B2 | 1/2007 | Schleiss et al. |
| 7,193,993 B2 | 3/2007 | Silvester |
| 7,254,601 B2 | 8/2007 | Baller et al. |
| 7,272,815 B1 | 9/2007 | Eldridge et al. |
| 7,349,987 B2 | 3/2008 | Redlich et al. |
| 7,370,350 B1 | 5/2008 | Salowey |
| 7,536,548 B1 | 5/2009 | Batke et al. |
| 7,716,489 B1 | 5/2010 | Brandt et al. |
| 7,761,460 B1 | 7/2010 | Hall |
| 7,950,044 B2 | 5/2011 | Brandt et al. |
| 7,990,967 B2 | 8/2011 | Brandt et al. |
| 8,032,250 B2 | 10/2011 | Farchmin et al. |
| 8,208,243 B2 | 6/2012 | Brandt et al. |
| 8,429,393 B1 | 4/2013 | Anderson et al. |
| 8,571,486 B2 | 10/2013 | Gasperi et al. |
| 8,732,658 B2 | 5/2014 | Plache et al. |
| 8,738,190 B2 | 5/2014 | Pai et al. |
| 8,762,588 B2 | 6/2014 | Hildebran et al. |
| 8,774,186 B2 | 7/2014 | Brandt et al. |
| 8,776,092 B2 | 7/2014 | Plache et al. |
| 8,850,092 B2 | 9/2014 | Hildebran et al. |
| 8,892,055 B2 | 11/2014 | Gasperi et al. |
| 8,909,926 B2 | 12/2014 | Brandt et al. |
| 8,996,745 B2 | 3/2015 | Decker et al. |
| 9,009,084 B2 | 4/2015 | Brandt et al. |
| 9,412,073 B2* | 8/2016 | Brandt ............... H04L 63/1408 |
| 9,423,848 B2* | 8/2016 | Keller ..................... G05B 15/02 |
| 9,467,289 B2* | 10/2016 | Anderson ........... H04L 63/1466 |
| 9,498,885 B2* | 11/2016 | Scott ...................... B25J 9/1694 |
| 9,696,704 B2* | 7/2017 | Xu ....................... G05B 19/4185 |
| 9,731,421 B2* | 8/2017 | Scott ...................... G05B 15/02 |
| 9,798,302 B2* | 10/2017 | Scott ...................... G05B 15/02 |
| 9,846,585 B2* | 12/2017 | Grgic ................. G05B 19/0423 |
| 9,857,781 B2* | 1/2018 | Hildebran ............. G06F 13/124 |
| 10,048,713 B2* | 8/2018 | Zhang ..................... H04L 67/28 |
| 10,091,208 B2* | 10/2018 | Brandt ..................... H04L 63/10 |
| 10,146,210 B2* | 12/2018 | Wielebski ............... H04W 4/80 |
| 10,185,600 B2* | 1/2019 | Plache .................... G06F 9/541 |
| 10,495,336 B2* | 12/2019 | Zhang ..................... F24F 11/46 |
| 2001/0013098 A1 | 8/2001 | Angelo et al. |
| 2002/0006790 A1 | 1/2002 | Blumenstock et al. |
| 2002/0023231 A1 | 2/2002 | Pathuel |
| 2002/0032871 A1 | 3/2002 | Malan et al. |
| 2002/0046290 A1 | 4/2002 | Andersson et al. |
| 2002/0078153 A1 | 6/2002 | Chung et al. |
| 2002/0099959 A1 | 7/2002 | Redlich et al. |
| 2002/0108077 A1 | 8/2002 | Havekost et al. |
| 2002/0112152 A1 | 8/2002 | VanHeyningen et al. |
| 2002/0120728 A1 | 8/2002 | Braatz et al. |
| 2002/0131366 A1 | 9/2002 | Sharp et al. |
| 2002/0147820 A1 | 10/2002 | Yokote |
| 2002/0152289 A1 | 10/2002 | Dube |
| 2002/0161905 A1 | 10/2002 | Haverinen et al. |
| 2002/0163920 A1 | 11/2002 | Walker et al. |
| 2002/0188870 A1 | 12/2002 | Gong et al. |
| 2002/0199122 A1 | 12/2002 | Davis et al. |
| 2003/0014500 A1 | 1/2003 | Schleiss et al. |
| 2003/0033516 A1 | 2/2003 | Howard et al. |
| 2003/0093521 A1 | 5/2003 | Schlonski et al. |
| 2003/0105535 A1 | 6/2003 | Rammler |
| 2003/0126472 A1 | 7/2003 | Banshof |
| 2003/0140094 A1 | 7/2003 | Collier et al. |

(56) References Cited

U.S. PATENT DOCUMENTS

| | | |
|---|---|---|
| 2003/0200437 A1 | 10/2003 | Oishi |
| 2003/0221124 A1 | 11/2003 | Curran et al. |
| 2003/0229812 A1 | 12/2003 | Buchholz |
| 2003/0233573 A1 | 12/2003 | Phinney |
| 2004/0015619 A1 | 1/2004 | Brown et al. |
| 2004/0019808 A1 | 1/2004 | Devine et al. |
| 2004/0027875 A1 | 2/2004 | Dinges et al. |
| 2004/0034774 A1 | 2/2004 | Le Saint |
| 2004/0049674 A1 | 3/2004 | Collier et al. |
| 2004/0059920 A1 | 3/2004 | Godwin |
| 2004/0073800 A1 | 4/2004 | Shah et al. |
| 2004/0075590 A1 | 4/2004 | Pearson et al. |
| 2004/0107345 A1 | 6/2004 | Brandt et al. |
| 2004/0125146 A1 | 7/2004 | Gerlach et al. |
| 2004/0139353 A1 | 7/2004 | Forcade |
| 2004/0153172 A1 | 8/2004 | Rousseau et al. |
| 2004/0260954 A1 | 12/2004 | Morse |
| 2005/0021839 A1 | 1/2005 | Russell et al. |
| 2005/0091492 A1 | 4/2005 | Benson et al. |
| 2005/0228998 A1 | 10/2005 | Chan et al. |
| 2005/0235148 A1 | 10/2005 | Scheidt et al. |
| 2006/0095771 A1 | 5/2006 | Appenzeller et al. |
| 2006/0206932 A1 | 9/2006 | Chong |
| 2008/0016569 A1 | 1/2008 | Hammer et al. |

OTHER PUBLICATIONS

Oman, P., et al., "Safeguarding IEDs, Substations, and SCADA Systems Against Electronic Intrusions," 3rd Annual Western Power Delivery Automation Conference, Apr. 2001, 20 pages.

Byres, E.J., "Designing secure networks for process control," Industry Technical Conference, Jun. 21-25, 1999, 6 pages.

European Office Action for EP Patent Application Serial No. 16153931.7, dated Aug. 16, 2016, 2 pages.

Final Office Action for U.S. Appl. No. 14/535,291, dated Sep. 1, 2016, 46 pages.

Weaver, Institute of Electrical and Electronics Engineers: "Factory Monitoring and Control Using the Internet". Proceedings of the 27th Annual Conference of the IEEE Industrial Electronics Society. Denver, CO, Nov. 29-Dec. 2, 2001, Annual Conference of the IEEE Industrial Electronics Society, New York, NY: IEEE, US, vol. 1 of 3 Conf. Nov. 27 and 29, 2001, 32 pages.

Bridges, et al., "AI Techniques Applied to High Performance Computing Intrusion Detection" Proceeding of the Tenth International Conference on Telecommunication Systems, Modeling and Analysis, Monterey CA, vol. 2, pp. 100-114, Oct. 3-6, 2002.

Harrold, Control Engineering; Online, Mar. 1, 2003; http://www.manufacturing.net/ctl.article/CA283196.

Spinellis, et al., Security Requirements, risks and recommendations for small enterprise and home-office environments; Information Management & Computer Security, vol. 7, No. 3, Dec. 31, 1999. http://www.dmst.aueb.gr/dds/pubs/jrnl/1999-IMCS-Soft-Risk/html/soho.pdf. Last accessed Mar. 18, 2010, 8 pages.

EPB Office Action dated Jul. 4, 2007 for European Patent Application No. 03 023 911.5, 7 pages.

EPB Office Action dated Jul. 8, 2008 for European Patent Application Serial No. 03 023 911.5, 7 pages.

EPC Office Action dated Jul. 4, 2007 for European Patent Application No. 03 023 916.4, 5 pages.

EPC Office Action dated Jun. 30, 2008 for European Patent Application No. 03 023 916.4, 6 pages.

European Search Report dated Oct. 31, 2005 dated Nov. 15, 2005 for European Patent Application Serial No. 03023911.4-2413, 3 Pages.

European Search Report dated Oct. 7, 2005 dated Nov. 3, 2005 for European Patent Application Serial No. 03023916.4-2413 PCT, 3 Pages.

Olaechea, Partial European Search Report, dated Feb. 18, 2005. 5 pages. The Hague.

Olaechea, Partial European Search Report; EP 03 02 3916; The Hague, dated Nov. 16, 2004.

Debar. et al., "A Neural Network Component for an Intrusion Detection System", Proceedings of the Computer Society Symposium on Research in Security and Privacy, Oakland, May 4-6, 1992, pp. 240-250, 1992, Los Alamitos, IEEE Comp. Soc. Press, US.

Teng et al., "Adaptive Real-Time Anomaly Detection Using Inductively Generated Sequential Patterns", Proceedings of the Symposium on Research in Security and Privacy, Oakland, May 7-9, 1990, pp. 278-284, Los Alamitos, IEEE Comp. Soc. Press, US.

Insight Consulting, "Insight on CRAMM IV; Insight Consulting Online"; Nov. 30, 2001; http://www.infosec-associates.com/framework/downloads/insight_cramm.pdf. Last accessed 3/18/10, 6 pages.

Interkama, "DuPont Shares Network Security Methodology"; Interkama Online, Mar. 15, 2002; http://www3.interkama.com/cipp/interkama/custom/pub/content,lang,2/ticket,g_u_e_s_t/oid,3781.

Rinaldi, "Introduction to Ethernet/IP". The Online Industrial Ethernet Book Issue 11/34. http://www.iebmedia.com/index.php?id=4272&parentid=74&themeid=255&hpid=2&showdetail=true&bb=1&appsw=1. Last accessed Mar. 18, 2010, 4 pages.

Falkenau, "Site networking and beyond"; ISA, Online, Jul. 1, 2003; http://www.isa.org/InTechTemplate.cfm?Section=Departments4&template=/ContentManagement/ContentDisplay.cfm&ContentID=28025. Last accessed Mar. 12, 2010, 3 pages.

Jones, et al. "Introducing EtherNET/IP". 6th ODVA annual meeting Mar. 8, 2000. http://nas.takming.edu.tw/houtsan/can4.PDF. Last accessed Mar. 12, 2010, 13 pages.

Office Action dated Apr. 27, 2009 for U.S. Appl. No. 10/661,239, 25 pages.

Office Action dated Jan. 1, 2009 for U.S. Appl. No. 10/661,696, 57 pages.

Office Action dated Jun. 10, 2009 for U.S. Appl. No. 10/661,690, 24 pages.

Office Action dated Aug. 13, 2009 for U.S. Appl. No. 10/661,239, 25 pages.

Office Action Dated Jan. 2, 2009 for U.S. Appl. No. 10/661,696, 51 pages.

Office Action dated Jul. 24, 2008 for U.S. Appl. No. 10/661,696, 49 pages.

Office Action dated Oct. 1, 2008 for U.S. Appl. No. 10/661,690, 31 pages.

Office Action dated Oct. 22, 2008 for U.S. Appl. No. 10/661,239, 19 pages.

Oman, et al., "Concerns About Intrusions Into Remotely Accessible Substation Controllers and Scada Systems", 2000, 16 pages, retrived from the Internet: URL: http://citeseer.ist.psu.edu/cache/papers/cs/26811/http:zSzzSzwww.csds.uidaho.edu zSzdirectorzSzSCADA.pdf/oman00concerns.pdf.

Rockwell Automation: "Plant Floor Security. Proposed Agenda for Sector Workshop" , May 6, 2002. Retrieved from the internet on Jun. 17, 2007. http://www.isd.mel.nist.gov/projects/processcontrol/members/documents/RA-Workshop-Agenda.pdf.

Rockwell Automation: "Rockwell Automation and DuPont Engineering sign worldwide licensing agreement to standardize and improve industrial computer networking security"; Online, Mar. 7, 2002; http://domino.automation.rockwell.com/applications/gs/region/gtwwebst.nsf/pages/Rockwell_Automation_and_DuPont_Engineering_Sign_ . . .

Lee, et al., "Neuro-Fuzzy Performan Management of Factory Automation Networks", 1997, 5 Pages.

Cutler, "Wireless Ethernet and How to Use It". The Industrial Ethernet Book Issue 5/24. http://www.iebmedia.com/index.php?id=4099&parentid=74&themeid=255&hpid=2&showdetail=true&bb=1&appsw=1. Last accessed Mar. 18, 2010, 3 pages.

Verano, "Defender Watches Over Industrial Control Networks", Aug. 10, 2003, 2 pages, retrived from the Internet: URL: http://web.archive.org/web/20030810201511/http://www.engineeringtalk.com/news/vra/vra102.html.

Wilmington Section ISA; "Wilmington ISA Section Plant Tour of Astropower"; ISA Online, Mar. 21, 2001; http://www.isa.org/{wilmdel/Sensor/Mar01.pdf.

Office Action dated Dec. 21, 2009 for U.S. Appl. No. 10/661,696, 60 pages.

(56) References Cited

OTHER PUBLICATIONS

Office Action dated Dec. 1, 2009 for U.S. Appl. No. 10/661,239, 17 pages.
Office Action dated Jan. 29, 2010 for U.S. Appl. No. 10/661,690, 33 pages.
Office Action dated Jun. 7, 2006 for U.S. Appl. No. 10/661,239, 20 pages.
Office Action dated May 9, 2008 for U.S. Appl. No. 10/661,239, 25 pages.
Office Action dated Sep. 10, 2007 for U.S. Appl. No. 10/661,239, 16 pages.
Office Action dated Sep. 22, 2006 for U.S. Appl. No. 10/661,239, 15 pages.
Office Action dated Dec. 15, 2005 for U.S. Appl. No. 10/661,239, 19 pages.
OA dated Apr. 5, 2007 for U.S. Appl. No. 10/661,239, 17 pages.
Office Action dated Dec. 12, 2007 for U.S. Appl. No. 10/661,239, 17 pages.
Office Action dated Jan. 9, 2008 for U.S. Appl. No. 10/661,690, 21 pages.
Office Action dated Jul. 12, 2007 for U.S. Appl. No. 10/661,690, 44 pages.
Office Action dated Oct. 25, 2007 for U.S. Appl. No. 10/661,696, 46 pages.
Office Action dated Jun. 21, 2007 for U.S. Appl. No. 10/661,696, 54 pages.
European Search Report dated Dec. 5, 2007, dated Jan. 4, 2008 for Application EP07117185, 6 pages.
Wong, et al. "Mutual Authentication and Key Exchange for Low Power Wireless Communications" Proceedings of MILCOM 2001, IEEE, pp. 39-43.
NG, et al. "Comments on Mutual Authentication and Key Exchange Protocols for Low Power Wireless Communications" Apr. 2004, IEEE Communication Letters vol. 8 No. 4 pp. 262-263.
Berrendonner, et al. "MAKE: Mutual Authentication with Key Exchange" Oct. 31, 2001, Internet Engineering Task Force, pp. 6-7.
European Office Action dated Sep. 11, 2008 for EP Application No. 07117185.4-2413, 6 pages.
Office Action dated Dec. 16, 2009 for U.S. Appl. No. 11/535,773, 38 pages.
Office Action dated dated May 11, 2010 for U.S. Appl. No. 11/535,773, 45 pages.
Lai, et al. "Scalable Session Key Construction Protocol for Wireless Sensor Networks" 2002, IEEE Workshop on Large Scale RealTime and Embedded Systems (LARTES).
Office Action dated Aug. 2, 2010 for U.S. Appl. No. 10/661,696, 60 pages.
Office Action dated Jan. 21, 2011 for U.S. Appl. No. 11/535,773, 55 pages.
Huang, et al. "Fast Authenticated Key Establishment Protocols for Self-Organizing Sensor Networks". In Proceedings of the 2nd ACM International Conference on Wireless Sensor Networks and Applications (WSNA'03), NY, USA, 2003, pp. 141-150.
Office Action dated Jul. 21, 2011 for U.S. Appl. No. 11/535,773, 42 pages.
Dichtl, et al., "A High Quality Physical Random Number Generator", Proc. Sophia Forums Microelectronics (SAME 2000), pp. 48-53, 2000.
Office Action for U.S. Appl. No. 13/593,037, dated Jul. 16, 2014, 39 pages.
Notice of Allowance for U.S. Appl. No. 10/661,696, dated Aug. 6, 2014, 45 pages.
Gervais, "Security Analysis of Industrial Control Systems", Aalto University—KTH Stockholm, Jun. 29, 2012, http://nordsecmob.aalto.fi/en/publications/theses_2012/gervais-arthur_thesis.pdf. Retrieved on Aug. 6, 2014, 90 pages.
European Office Action dated Dec. 19, 2014 for European Patent Application No. 03023911.5, 9 pages.

"EtherNet/IP Adaptation of CIP Specification" Jun. 5, 2001, Open DeviceNet Vendor Assoc. & ControlNet International, Release 1.0, vol. 2, retrieved from [http://read.pudn.com/downloads166/ebook/763212/EIP-CIP-V2-1.0.pdf], retrieved on Mar. 18, 2015, 122 pages.
"CIP Common Specification" Jun. 5, 2001, Open DeviceNet Vendor Assoc. & ControlNet International, Release 1.0, vol. 1, retrieved from [http://read.pudn.com/downloads166/ebook/763211/EIP-CIP-V1-1.0.pdf], retrieved on Mar. 18, 2015, 792 pages.
European Office Action dated Feb. 17, 2015 for European Patent Application No. 03023916.4, 4 pages.
Notice of Allowance dated Dec. 8, 2014 for U.S. Appl. No. 13/593,037, 28 pages.
Li, et al."Research of android malware detection based on network traffic monitoring" 2014 IEEE 9th Conference on Industrial Electronics and Applications (ICIEA), Jun. 2014, pp. 1739-1744.
Singh, et al. "Visualization of flow data based on clustering technique for identifying network anomalies", IEEE Symposium on Industrial Electronics & Applications, 2009. ISIEA 2009. vol. 2, Oct. 2009, pp. 973-978.
Ali, et al. "The affect of fuzzification on neural networks intrusion detection system", 4th IEEE Conference on Industrial Electronics and Applications, ICIEA 2009, May 2009, pp. 1236-1241.
Vollmer, et al. "Autonomic Intelligent Cyber-Sensor to Support Industrial Control Network Awareness," IEEE Transactions on Industrial Informatics, vol. 10, Issue: 2, May 2014, pp. 1647-1658.
Office Action for U.S. Appl. No. 14/681,026, dated Nov. 12, 2015, 44 pages.
Office Action for U.S. Appl. No. 14/535,291, dated Mar. 7, 2016, 67 pages.
Notice of Allowance for U.S. Appl. No. 14/681,026, dated Mar. 28, 2016, 22 pages.
European Office Action dated Mar. 9, 2016 for European Patent Application No. 03023916.4, 5 pages.
Toews, et al. "Detection, Localization, and Sex Classification of Faces from Arbitrary Viewpoints and under Occlusion" IEEE Transactions on Pattern Analysis and Machine Intelligence, Sep. 2009, vol. 31, Issue: 9 pp. 1567-1581, IEEE Journals & Magazines, 15 pages.
Meng, et al. "Automatic Profiling of Network Event Sequences: Algorithm and Applications" INFOCOM 2008. The 27th Conference on Computer Communications. IEEE Year: 2008 pp. 852-860, IEEE Conference Publications, 9 pages.
Li, et al. "Link travel time estimation using single GPS equipped probe vehicle" The IEEE 5th International Conference on Intelligent Transportation Systems, 2002. Sep. 2002, pp. 932-937, IEEE Conference Publications, 6 pages.
Armand, et al. "Modelling stop intersection approaches using Gaussian processes" 2013 16th International IEEE Conference on Intelligent Transportation Systems—(ITSC), Oct. 2013, pp. 1650-1655. 6 pages.
European Office Action dated Apr. 20, 2016 for European Patent Application No. 16153931.7, 6 pages.
Communication pursuant to Article 96(2) EPC received for EP Patent Application Serial No. 03023911.5 dated Aug. 21, 2006, 04 pages.
Decision to grant a European patent pursuant to Article 97(1) EPC received for EP Patent Application Serial No. 16153931.7, dated Dec. 3, 2020, 2 pages.
Partial European Search Report received for European Patent Application Serial No. 03023911.5 dated Mar. 30, 2005, 6 pages.
European Search Report received for European Patent Application Serial No. 03023911.5 dated Nov. 15, 2005, 8 pages.
Extended European Search Report received for European Patent Application Serial No. 03023912.3 dated Jan. 16, 2012, 4 pages.
Palensky et al.,"Security Considerations for FAN-Internet connections" Factory Communication Systems, 2000. Proceedings, Sep. 6, 2000, pp. 27-35.
Carlson, Rolf, "Sandia SCADA Program High-Security SCADA LDRD Final Report" URL: https://www.smartgrid.gov/files/documents/HighSecurity_SCADA_LDRD_Final_Report_200204.pdf, Apr. 2002, 20 pages.
Extended European Search Report received for European Patent Application Serial No. 07117185.4 dated Apr. 1, 2008, 05 pages.

(56) References Cited

OTHER PUBLICATIONS

Communication pursuant to Article 94(3) EPC received for Application Serial No. 07117185.4 dated May 26, 2011, 02 pages.

* cited by examiner

IF:
- LEARNED TRAFFIC PATTERN DEVIATION DETECTED ON WELDING AREA NETWORK
- UNEXPECTED DATA FROM UNKNOWN SOURCE
- DELAY OF PERIODIC I/O TRAFFIC FROM STAMPING CONTROLLER IN EXCESS OF THRESHOLD
- EXCESSIVE PROCESSING DETECTED IN BATCH PROCESS CONTROLLER
- ...

THEN:
- INCREASE PRIORITY OF LEARNED TRAFFIC
- APPLY RATE LIMITING RULE
- PLACE MACHINE IN SLOW-OPERATION MODE
- CHANGE ADDRESSING USED BY CONTROLLER AND I/O MODULES
- ...

SYSTEM AND METHODOLOGY PROVIDING AUTOMATION SECURITY ANALYSIS AND NETWORK INTRUSION PROTECTION IN AN INDUSTRIAL ENVIRONMENT

REFERENCE TO RELATED APPLICATION(S)

This application is a continuation of, and claims priority to each of, U.S. patent application Ser. No. 14/681,026 (now U.S. Pat. No. 9,412,073), entitled SYSTEM AND METHODOLOGY PROVIDING AUTOMATION SECURITY ANALYSIS AND NETWORK INTRUSION PROTECTION IN AN INDUSTRIAL ENVIRONMENT, which was filed on Apr. 7, 2015, which is a continuation of U.S. patent application Ser. No. 13/593,037 (now U.S. Pat. No. 9,009,084), entitled SYSTEM AND METHODOLOGY PROVIDING AUTOMATION SECURITY ANALYSIS AND NETWORK INTRUSION PROTECTION IN AN INDUSTRIAL ENVIRONMENT, which was filed on Aug. 23, 2012, which is a continuation-in-part of, and claims priority to, U.S. patent application Ser. No. 10/661,696 (now U.S. Pat. No. 8,909,926), entitled SYSTEM AND METHODOLOGY PROVIDING AUTOMATION SECURITY ANALYSIS, VALIDATION, AND LEARNING IN AN INDUSTRIAL CONTROLLER ENVIRONMENT, which was filed on Sep. 12, 2003, and which claims priority to U.S. Provisional Patent Application Ser. No. 60/420,006, entitled SYSTEM AND METHODOLOGY PROVIDING AUTOMATION SECURITY IN AN INDUSTRIAL CONTROLLER ENVIRONMENT, which was filed on Oct. 21, 2002, the entireties of these related applications are incorporated herein by reference. This application is also related to application Ser. No. 14/535,291, entitled SYSTEM AND METHODOLOGY PROVIDING AUTOMATION SECURITY ANALYSIS, VALIDATION, AND LEARNING IN AN INDUSTRIAL CONTROLLER ENVIRONMENT, which was filed on Nov. 6, 2014.

TECHNICAL FIELD

The disclosed subject matter relates generally to industrial control systems, e.g., to a system and methodology to facilitate electronic and network security in an industrial automation system.

BACKGROUND

Industrial controllers are special-purpose computers utilized for controlling industrial processes, manufacturing equipment, and other factory automation, such as data collection or networked systems. In accordance with a control program, the industrial controller, having an associated processor (or processors), measures one or more process variables or inputs reflecting the status of a controlled system, and changes outputs effecting control of such system. The inputs and outputs may be binary, (e.g., on or off), as well as analog inputs and outputs assuming a continuous range of values.

Measured inputs received from such systems and the outputs transmitted by the systems generally pass through one or more input/output (I/O) modules. These I/O modules serve as an electrical interface to the controller and may be located proximate or remote from the controller including remote network interfaces to associated systems. Inputs and outputs may be recorded in an I/O table in processor memory, wherein input values may be asynchronously read from one or more input modules and output values written to the I/O table for subsequent communication to the control system by specialized communications circuitry (e.g., back plane interface, communications module). Output modules may interface directly with one or more control elements, by receiving an output from the I/O table to control a device such as a motor, valve, solenoid, amplifier, and the like.

At the core of the industrial control system is an industrial controller such as a Programmable Logic Controller (PLC), a Programmable Automation Controller (PAC), or PC-based controller. Such controllers are programmed by systems designers to operate manufacturing processes via user-designed logic programs, sequential function charts, function block diagrams, structured text, or other user programs. The user programs are stored in memory and generally executed by the controller in a sequential manner, although instruction jumping, looping and interrupt routines, for example, are also common. Associated with the user program are a plurality of memory elements or variables that provide dynamics to controller operations and programs. These variables can be user-defined and can be defined as bits, bytes, words, integers, floating point numbers, timers, counters and/or other data types to name but a few examples.

Various remote applications or systems often attempt to update and/or acquire industrial controller information or related device information via a plurality of different competing and often incompatible or insecure network technologies. A major concern with this type of access to industrial controllers, and control systems in general, relates to the amount of security that is provided when sending or receiving data to and from the industrial controller and/or associated equipment. In most factories or industrial environments, complex and sometimes dangerous operations are performed in a given manufacturing setting. Thus, if a network-connected controller is inadvertently accessed, or, even worse, intentional sabotage occurs by a rogue machine or individual, potentially harmful results can occur.

One attempt at providing security in industrial control systems relates to simple password protection to limit access to the systems. This can take the form of a plant or controls Engineer or Administrator entering an alpha-numeric string that is typed by an operator each time access is attempted, wherein the controller grants access based on a successful typing of the password. These type passwords are highly prone to attack or discovery, however. Often, users employ passwords that are relatively easy to determine (e.g., person's name or birthday). Sometimes, users exchange passwords with other users, the password is overheard, or a user with improper authorization comes in contact with the password. Even if a somewhat higher level of security is provided, parties employing sophisticated hacking techniques can often penetrate sensitive control systems. Such techniques can allow non-authorized parties to change the control systems' control algorithms in dangerous ways, to assume control of production equipment, or to alter I/O streams between the control system and the controlled equipment. Accordingly, access should be limited to authorized users and/or systems in order to mitigate potentially harmful consequences.

SUMMARY

The following presents a simplified summary of the disclosed subject matter in order to provide a basic understanding of some aspects of the disclosed subject matter. This summary is not an extensive overview of the disclosed subject matter. It is intended to neither identify key or critical elements of the disclosed subject matter nor delineate the scope of the disclosed subject matter. Its sole purpose is to present some concepts of the disclosed subject matter in a simplified form as a prelude to the more detailed description that is presented later.

The disclosed subject matter relates to a system and methodology to facilitate network and/or automation device security in an industrial automation environment. Various systems and methodologies are provided to promote security across and/or within networks and in accordance with different automation device capabilities. In one aspect of the disclosed subject matter, a Security Analysis Methodology (SAM) and tool provides an automated process, component, and tool that generates a set (or subset) of security guidelines, security data, and/or security components. An input to the tool can be in the form of an abstract description or model of a factory, wherein the factory description identifies one or more assets to be protected and associated pathways to access the assets. Security data generated by the tool includes a set of recommended security components, related interconnection topology, connection configurations, application procedures, security policies, rules, user procedures, and/or user practices, for example.

SAM can be modeled on a risk-based/cost-based approach, if desired. A suitable level of protection can be determined to facilitate integrity, privacy, and/or availability of assets based on risk and/or cost. In addition, descriptions of shop floor access, Intranet access, Internet access, and/or wireless access can also be processed by the tool. Since multiparty involvement can be accommodated (IT, Manufacturing, Engineering, etc.), the tool can be adapted for partitioned security specification entry and sign-off. The security data of the SAM tool can be generated in a structured security data format (e.g., XML, SQL, etc.) that facilitates further validation and compliance checking of the security data, if desired.

In another aspect of the disclosed subject matter, a security validation methodology and associated tools can be provided. The validation tools perform initial and periodic live security assessment of a physical system. This enables security flaws or weaknesses to be identified. One aspect of the tools is to check a system prior to security modifications in order to assess current security levels. Another aspect is to check a system for conformance to recommendations of a security analysis, to standards such as ISO (International Organization for Standardization), or other security standards. The validation tools can be executed on end devices (host based), and/or executed as an independent device that is operatively coupled to a network (network based) at selected points. One function of host-validation tools is to perform vulnerability scanning and/or auditing on devices. This includes revision checks, improper configuration check, file system/registry/database permissions check, user privilege/password and/or account policy checks, for example.

One function of the network validation tools is to perform vulnerability scanning and auditing on the networks. This includes checking for susceptibility to common network-based attacks, searching for open TCP/UDP ports, and scanning for vulnerable network services. The tools can also attempt to gain key identity information about end devices that may enable hacker entry. Another function of the network validation tools is to perform vulnerability scanning and auditing on firewalls, routers, and/or other network/security devices. In addition, a complementary tool can be provided to assess CIP-based factory automation systems for security. This will typically be a network-based tool, since factory automation devices often are not as capable as general purpose computing devices. The tool can also be operable in an assessment mode to discover system flaws with little or no configuration, and the tool can operate in a validation mode to check system security against security analysis methodology determinations described above. Still other functions can include non-destructively mapping a topology of information technology (IT) and automation devices, checking revisions and configurations, checking user attributes, and/or checking access control lists. The validation tools described herein can also be adapted to automatically correct security problems (e.g., automatically adjust security parameters/rules/policies, install new security components, remove suspicious components, and so forth).

According to another aspect of the disclosed subject matter, a Security Learning system is provided that can include network-based aspects and/or host-based aspects similar to some of the security aspects described above with respect to the Validation tools. A network-based security learning system (also referred to as learning component) is provided that monitors an automation network during a predetermined training period (e.g., monitor network activities for 1 week). During the training period, the learning component monitors and learns activities or patterns, such as the number of network requests to and from one or more assets, the type of requests (e.g., read/write, role/identity of person/system requesting access, time of requests), status or counter data (e.g., network access counters, error codes) which can be provided or queried from a learning or status component within the asset, and/or substantially any data type or pattern that may be retrieved from the network and/or the asset.

After the training period, the learning component monitors the automation network and/or assets for detected deviations from data patterns learned during the training period. If desired, a user interface can be provided that allows a user to adjust one or more pattern thresholds. The user interface can also provide options for the type of data patterns to monitor/learn. For example, if the number of network requests to the asset has been monitored and learned to be about 1000 requests per hour during the past month, then a threshold can be set via the user interface that triggers an alarm or causes an automated event to occur if a deviation is detected outside of the threshold (e.g., automatically disable all network requests from the other networks if the number of network requests to the asset exceeds 10% of the average daily network requests detected during the training period).

The following description and the annexed drawings set forth certain illustrative aspects of the disclosed subject matter. These aspects are indicative, however, of but a few of the various ways in which the principles of the disclosed subject matter may be employed, and the disclosed subject matter is intended to include all such aspects and their equivalents. Other advantages and novel features of the disclosed subject matter will become apparent from the following detailed description of the disclosed subject matter when considered in conjunction with the drawings.

BRIEF DESCRIPTION OF THE DRAWINGS

FIG. 15 illustrates an exemplary If-Then format for countermeasure rules employed by a learning component.

DETAILED DESCRIPTION

Figure 1:
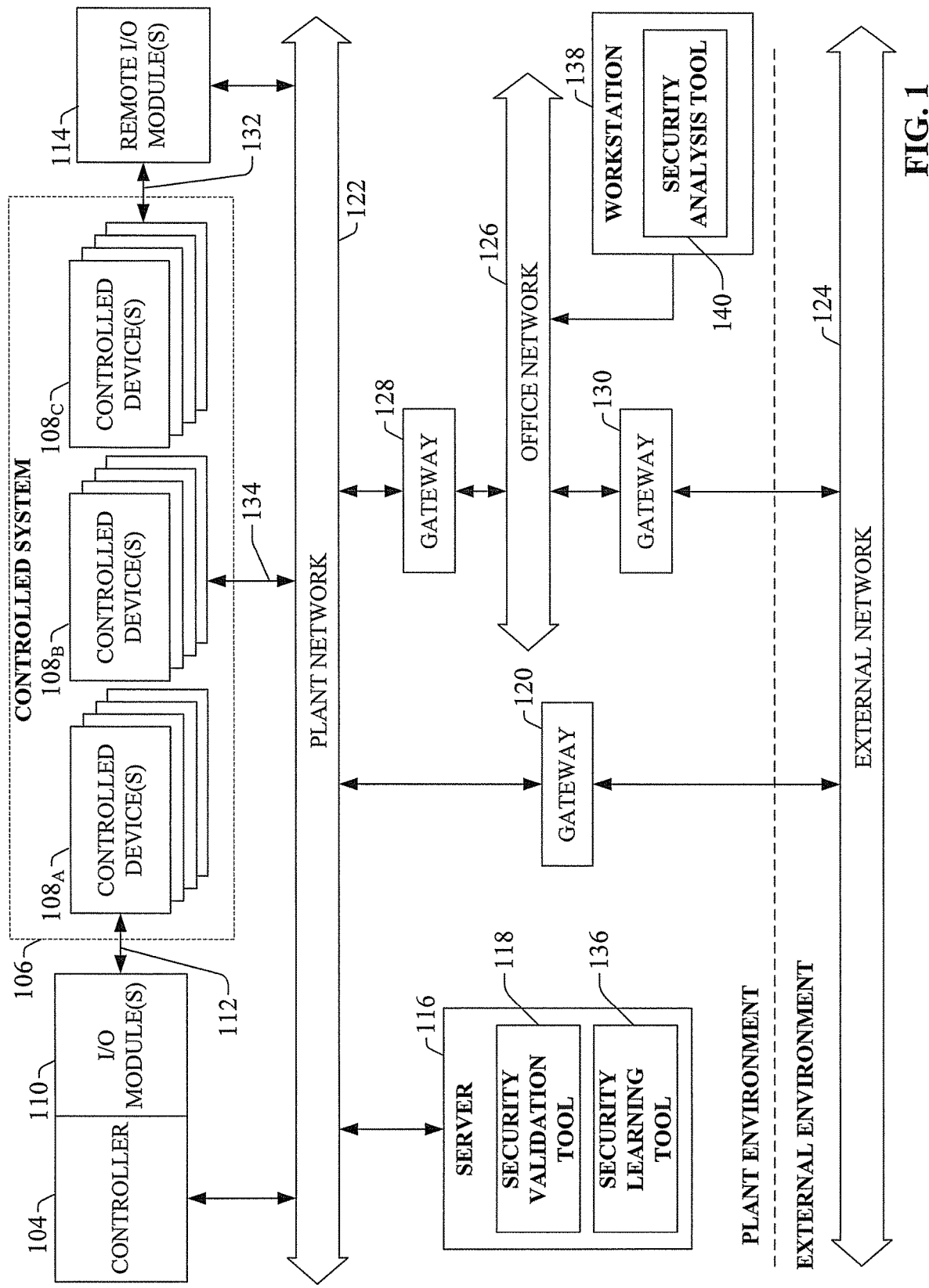
FIG. 1 is a block diagram illustrating an exemplary automation environment.

The disclosed subject matter relates to a system and methodology facilitating automation security in a networked-based industrial controller environment. Various components, systems and methodologies are provided to facilitate varying levels of automation security in accordance with security analysis tools, security validation tools and/or security learning systems. The security analysis tool receives abstract factory models or descriptions for input and generates an output that can include security guidelines, components, topologies, procedures, rules, policies, and the like for deployment in an automation security network. The validation tools are operative in the automation security network, wherein the tools perform security checking and/or auditing functions, for example, to determine if security components are in place and/or in suitable working order.

The security learning system monitors and learns network traffic patterns during a learning phase, triggers alarms or events based upon detected deviations from the learned patterns, and/or causes other automated actions to occur. The security learning component can leverage the distinctive data traffic patterns inherent in automation networks in general (as distinguished from general-purpose networks such as those found in a home or office environment) to identify unexpected or corrupt data traffic. Moreover, the countermeasures triggered by the security learning system can be tailored to automation equipment in use or the industrial processes being regulated, as will be discussed in more detail infra.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removably affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 depicts an exemplary automation environment in which aspects of the subject security tools can be implemented. Controlled system 106 can represent any industrial processor operation under the control of controller 104. Controlled system 106 can comprise a number of controlled devices $108_A$, $108_B$, and $108_C$ that receive output signals from or send input signals to controller 104 over any suitable combination of hardwired or networked connectivity to regulate the controlled process or operation. Controller 104 can comprise, for example, a programmable automation controller (PAC), a soft controller executed on a personal computer or server, or other such controller, and can include one or more processors capable of executing a control program.

Controller 104 can include one or more local I/O modules 110 that provide hardwired connectivity 112 to at least a subset of the controlled equipment and telemetry devices, such as controlled devices $108_A$. I/O modules 110 share a chassis or rack with the controller and interface with controller over a backplane. Additionally or alternatively, controller 104 can exchange control and status data with a subset of the controlled devices, such as controlled devices $108_B$, over a direct connection 134 to the plant network 122. Plant network 122 can comprise, for example, a control and information protocol (CIP) network such as DeviceNet or Controlnet. Other suitable networks include, but are not limited to, Ethernet, DH/DH+, Remote I/O, Fieldbus, Modbus, Profibus, CAN, wireless networks, or serial protocol. Controlled devices $108_B$ that exchange data with controller 104 via a direct network connection typically include an integrated network interface that places the device on the network. Data to be exchanged between the device and the controller can then be mapped within the controller and addressed within the control program therein.

Controller 104 can also exchange data with a subset of controlled devices, such as devices $108_C$, via remote I/O modules 114. Remote I/O modules 114 are similar to local I/O modules 110 in that they exchange signaling with controlled devices $108_C$ over hardwired connections 132. However, remote I/O modules 114 interface with the controller 104 over the plant network 122 rather than reside locally within the controller's chassis.

An I/O table within the controller's memory can maintain present analog and digital values corresponding to the various inputs and outputs read from or written to the local and remote I/O modules or the controlled devices themselves. That is, input values read from controlled devices by the I/O modules 110 or 114 (e.g., analog or digital input modules) can be written to the I/O table. These input values can then be read by the control program executing in the controller, which updates its control variables accordingly. Similarly, output values generated by the control program can be written to the I/O table, causing corresponding output data signals to be applied to the analog or digital output modules comprising I/O modules 110 and 114. The control program executed by controller 104 can comprise any conceivable type of code used to process input signals read into the controller and to control output signals from the controller, including but not limited to ladder logic, sequential function charts, function block diagrams, or structured text.

In many industrial facilities, plant networks such as network 122 (that is, networks dedicated to exchanging automation and control data between automation assets) interface with one or more office networks, such as office network 126. Connectivity between the plant network and the office network has become increasingly common as office-side reporting tools have been developed that directly leverage production data generated by automation devices on the plant network. Moreover, plant managers often wish to monitor a controlled system on the plant floor from their office computers (e.g., via an HMI application running on the office computer), which also necessitates a connection between the office network 126 and plant network 122. Such a connection can be implemented via a gateway device 128 (e.g., a router, hub, or switch), or through a field device having a connection to both networks (e.g., an HMI workstation having two network ports, allowing the workstation to be added to both the plant and office networks). Since the office network 126 is typically connected to an external network 124, such as the Internet (e.g., via gateway 130), the connection between the plant network and the office network exposes the plant network to possible malicious intrusions from outside the plant environment, which compromises the security of the controlled system. Such malicious intrusions can, for example, cause the controlled devices $108_A$-$108_C$ to operate in an unsafe manner, either through a deliberate outside effort or through excessive data traffic entering the plant network that can result in delayed device response times. Plant network 122 can also be directly connected to the external network 124 (e.g., via gateway 120), which increases the risk of undesirable data traffic from an external source.

The various security tools described herein are designed to mitigate these risks using techniques tailored to the industrial automation environment. These tools can include a security analysis tool 140, a security validation tool 118, and a security learning tool 136. In the exemplary environment depicted in FIG. 1, security validation tool 118 and security learning tool 136 are deployed on a server 116 connected to the plant network 122, allowing these tools to verify security configurations, monitor data traffic patterns on the network, monitor automation device activity, deploy countermeasure outputs to the devices and equipment on the plant network, and perform other functions as will be described in more detail infra. Security analysis tool 140 is depicted as residing on a workstation 138 connected to the office network 126. However, the functions performed by the security analysis tool, which include generating security recommendations and configuration information based on user-provided factory description information, can be performed off-line and thus do not necessarily require connection to a network.

Figure 2:
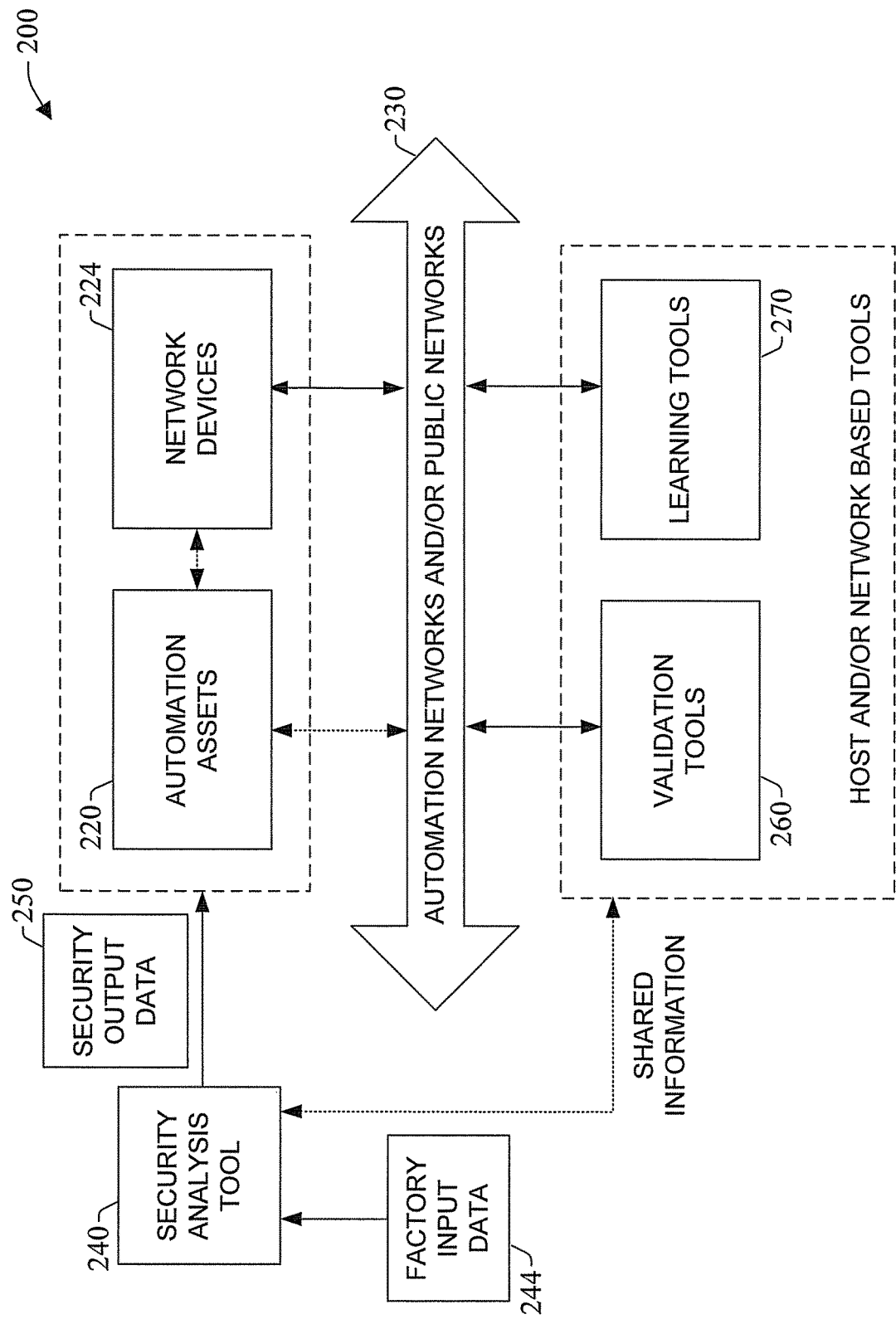
FIG. 2 is a schematic block diagram illustrating automation security tools in accordance with an aspect of the disclosed subject matter.

Referring now to FIG. 2, a system 200 illustrates various automation security tools in accordance with an aspect of the disclosed subject matter. One or more automation assets 220 communicate and cooperate with various network devices 224 across a network 230. The automation assets 220 include substantially any type of control device, communications module, computer, I/O device, Human Machine Interface (HMI), etc., that communicates via the network 230 which includes control, automation, and/or public networks. In one example, the automation assets 220 include Programmable Logic Controllers (PLC) (e.g., controller 104 of FIG. 1) that can also communicate with and control various other assets, such as Input/Output modules including Analog, Digital, Programmed/Intelligent I/O modules, other programmable controllers, communications modules, and the like. Automation assets 220 can also comprise the controlled devices and equipment being regulated by the controller and I/O modules (e.g., controlled devices $108_A$-$108_C$ of FIG. 1). The network 230 includes public networks such as the Internet, Intranets, and automation networks such as Control and Information Protocol (CIP) networks, including DeviceNet and ControlNet. Other networks 230 include Ethernet, DH/DH+, Remote I/O, Fieldbus, Modbus, Profibus, wireless networks, serial protocols, and so forth. In addition to the automation assets 220, the network devices 224 include various possibilities (hardware and/or software components). These include components such as switches with virtual local area network (VLAN) capability, LANs, WANs, proxies, gateways, routers, firewalls, virtual private network (VPN) devices, intrusion detection systems, servers, clients, computers, configuration tools, monitoring tools, and/or other devices.

According to one aspect of the disclosed subject matter, various security tools can be provided with the system 200. Although three tools are illustrated, it is to be appreciated that more or less than three tools can be employed with the disclosed subject matter and in a plurality of similar or different combinations. In one aspect, a security analysis tool 240 is provided that receives factory input data 244 describing or modeling various aspects of the automation assets 220, network devices 224, network 230, and/or system 200. The security analysis tool 240 processes the factory input data 244 and generates security output data 250 which is then deployed to machines and/or users in order to facilitate suitable network security measures and practices in the system 200. As will be described in more detail below, such measures can include security recommendations, configuration guidelines or adjustments, procedures, rules, policies, and security parameters, for example, that are utilized to mitigate unwanted intrusions or attacks from the network 230 that may affect the automation assets 220 and/or network devices 224.

In another aspect of the disclosed subject matter, one or more validation tools 260 can be provided (host and/or networked based) that perform automated security auditing and checking functions on the network 230, the automation assets 220, and/or network devices 224 to determine if suitable security standards have been implemented. The validation tools also perform periodic or monitored assessments within the system 200 to determine if potential network threats or attacks are at hand. As will be described in more detail below, this can include automated and/or healing operations to mitigate network security threats. In another aspect of the disclosed subject matter, one or more learning tools 270 can be provided (host and/or networked based) that learn system activities or patterns during a training or configuration period, then perform automated actions in response to detected deviations from the learned activities or patterns. Such automated actions can include altering network activity (e.g., tracing and blocking a source of undesirable traffic, applying a rate limiting rule to undesirable traffic, placing assets on a different VLAN or communication channel, etc.) and triggering an alarm such as an e-mail or pager to notify an entity (user and/or machine) of a potential or detected problem. It is noted that the security tools 240, 250 and/or 260 can share or exchange information between tools. For example, the security analysis tool 240 can receive input from the validation tool 260 (e.g., three new network devices detected in topology), wherein the security analysis tool generates new or adjusted security output data 250 in response thereto. It is further noted that one or more of the automation assets 220 may directly access the network 230 and/or may employ the network devices 224 to achieve network access.

Figure 3:
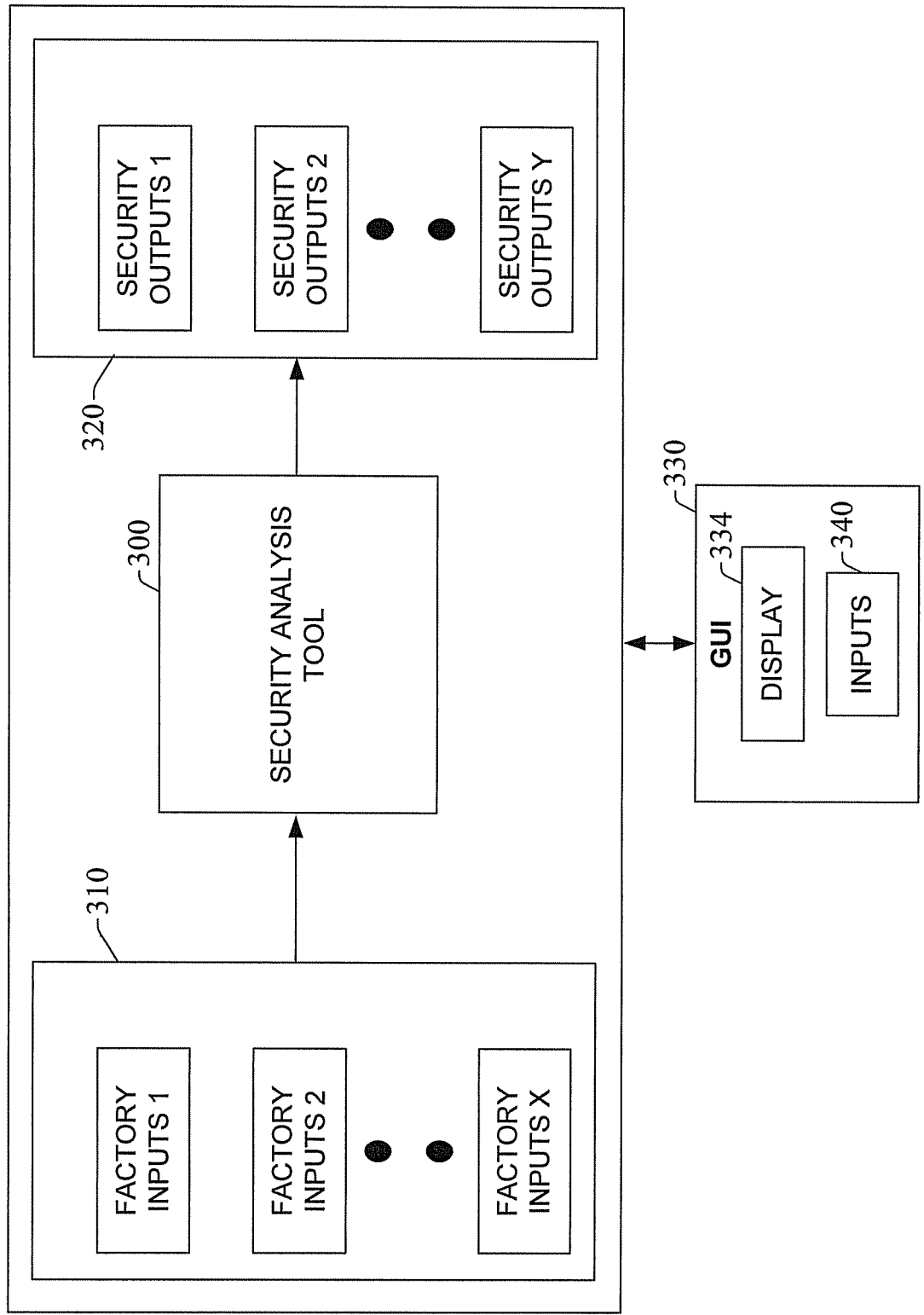
FIG. 3 is a schematic block diagram illustrating a security analysis tool in accordance with an aspect of the disclosed subject matter.

Turning to FIG. 3, a security analysis tool 300 is illustrated in accordance with an aspect of the disclosed subject matter. The security analysis tool 300 operates on a computer or workstation (e.g., workstation 138 of FIG. 1) and receives one or more factory inputs 310 that can be generated from a plurality of sources. Such sources can include user input, model input (e.g., asset models, network models), schemas, formulas, equations, maps, and codes, for example. The factory inputs 310 are then processed by the security analysis tool 300 to generate one or more security outputs 320 which can also be provided in various forms such as manuals, documents, schemas, executables, codes, e-mails, and/or other electronic data that is described in more detail below. As illustrated, a Graphical User Interface 330 (GUI) or interface application can be provided to interact with the security analysis tool 300, factory inputs 310, and/or security outputs 320. This can include substantially any type of application that sends, retrieves, processes, and/or manipulates factory input data 310, receives, displays, formats, and/or communicates security output data 320, and/or facilitates operation of the security analysis tool 300. For example, such interfaces 330 can also be associated with an engine, editor tool, or web browser, although other type applications can be utilized. The GUI 330 includes a display 334 having one or more display objects (not shown) including such aspects as configurable icons, buttons, sliders, input boxes, selection options, menus, tabs and so forth having multiple configurable dimensions, shapes, colors, text, data and sounds to facilitate operations with the security analysis tool 300. In addition, the GUI 330 can also include a plurality of other inputs 340 or controls for adjusting and configuring one or more aspects of the disclosed subject matter. This can include receiving user commands from a mouse, keyboard, speech input, web site, remote web service and/or other device such as a camera or video input to affect or modify operations of the GUI 330.

Figure 4:
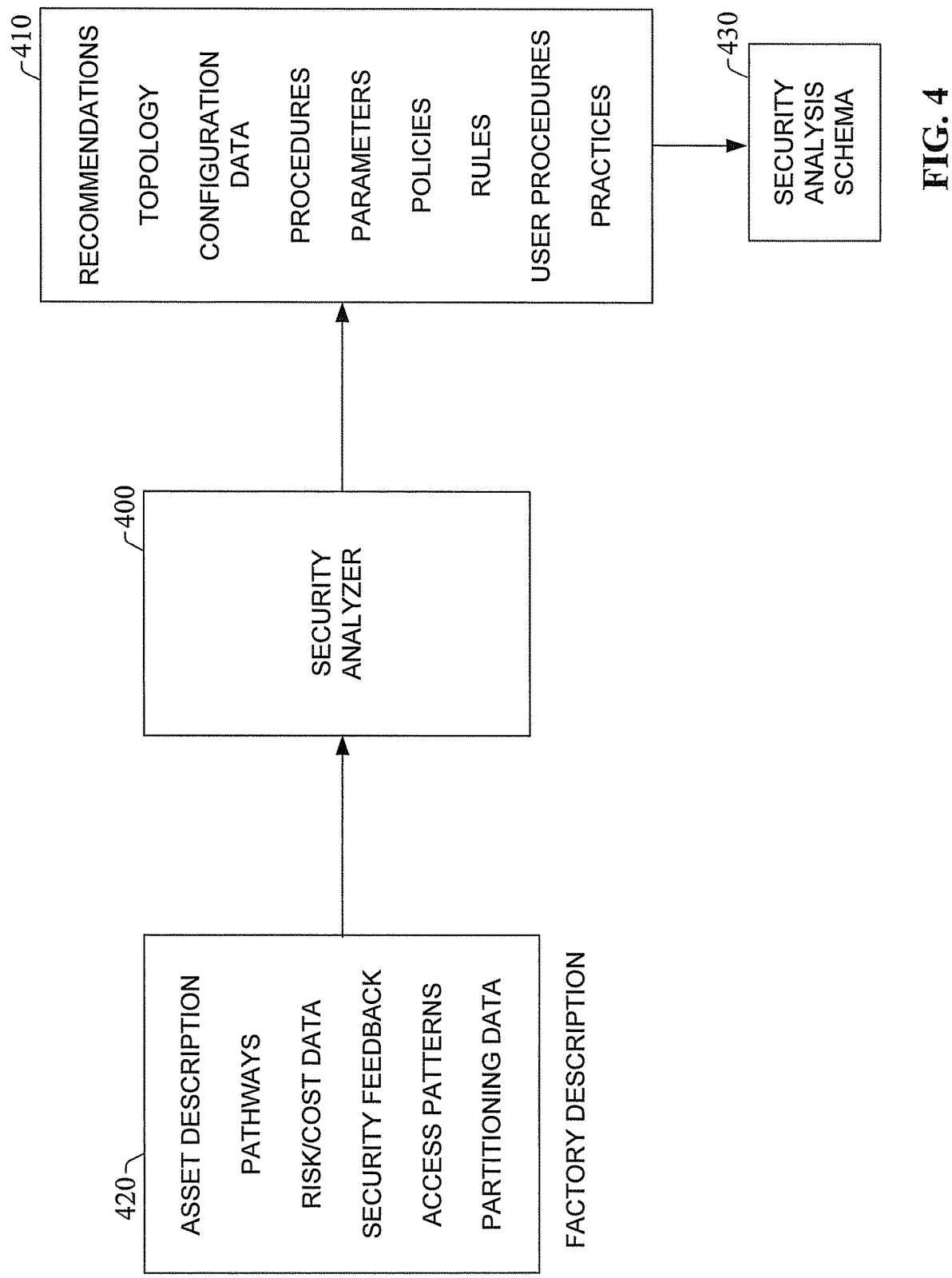
FIG. 4 is a diagram illustrating an example security analyzer in accordance with an aspect of the disclosed subject matter.

Referring now to FIG. 4, an example security analyzer 400 is illustrated in accordance with an aspect of the disclosed subject matter. The security analyzer 400 can be an automated process, application, component, and/or tool that generates a set of security guidelines or security data 410 and executes a Security Analysis Method (SAM) in accordance with the disclosed subject matter. An input to the security analyzer 400 is an abstract description of a factory depicted as factory data 420. The factory data 420 can describe or model one or more automation assets to be protected and associated network pathways to access the assets. The factory data can also include risk data and cost data associated with the respective automation assets and the processes carried out by these assets. For example, automation assets carrying a high risk of injury to personnel or having the potential to compromise the integrity of a manufactured product if operated abnormally (as may result from a network security breach) can be identified as high-risk assets in the factory data. Likewise, automation assets having a potentially high financial liability if operated improperly (e.g. through damage to other assets or by virtue of the asset's inherent cost) can be identified as such to the security analyzer 400 using factory data 420. Other factory data 420 can include security feedback from other security tools, network access patterns, and partitioning data, for example. Security data 410 generated by the security analyzer 400 includes a set of recommended security components, related interconnection topology, connection configurations, application procedures, security policies, rules, user procedures, and/or user practices, for example, that is employed to guide users and adapt systems with various security measures. The security recommendations, configurations, and policies generated by the security analyzer can be tailored to the automation system or process described by the factory data 420 by prioritizing protection of high-risk or high-cost automation assets (e.g., expensive or dangerous machinery, devices that regulate critical production operations, etc.). In this regard, the security analyzer 400 can identify the automation assets requiring prioritized security, and leverage knowledge of the network architecture and associated network devices in use to customize a set of security recommendations, device configurations, policies, etc. that ensure adequate network protection of the critical assets.

The Security Analysis Method noted above, and security analyzer 400, can also be modeled on a risk-based/cost-based approach, if desired. A suitable level of protection can be determined to facilitate integrity, privacy, and/or availability of assets based on risk and/or cost. For example, the strength of recommended security parameters, policies, and procedures can be increased if lower security risks are desired, even though such measures are associated with higher implementation costs and/or maintenance costs. Alternatively, the strength of security measures can be decreased if higher risks associated with network attacks or intrusions are deemed acceptable or if low implementation costs are desired. In one or more embodiments, the security analyzer 400 can output multiple sets of security outputs 410 corresponding to multiple tiers of security strength, where stronger security recommendations are typically associated with greater costs in terms of capital required to implement the security recommendations, impact on overall system performance, etc. In such embodiments, the multiple sets of security outputs can include estimates of the economic and performance costs associated with each set, allowing the user to make an informed selection regarding which level of recommended security is most suitable for the needs of a given automation system.

In addition, descriptions of shop floor access, Intranet access, Internet access, wireless access and/or other network access patterns can also be described as factory data 420 and processed by the security analyzer 400. Since multiple party involvement can be accommodated (e.g., IT, Manufacturing, Engineering, etc.), the security analyzer 400 can be adapted for partitioned security specification entry and sign-off. The security data 410 can be generated in a structured security data format (e.g., XML, SQL, etc.) that facilitates further validation and compliance checking of the security data, if desired. As illustrated, a security analysis schema 430 which is described in more detail below, can be derived from the security data 410 and can be provided to other entities such as users or machines for further security processing/implementations.

Figure 5:
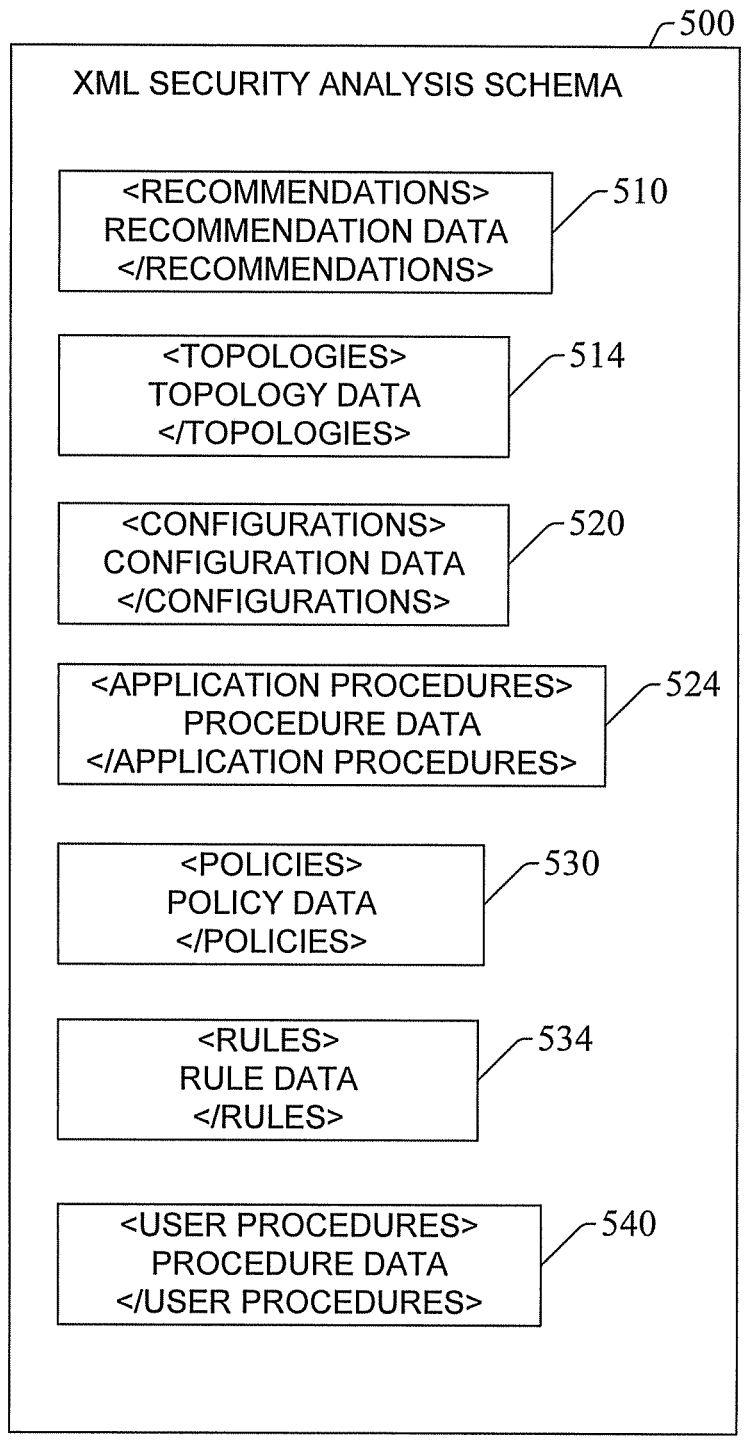
FIG. 5 is a diagram illustrating an example security analysis schema in accordance with an aspect of the disclosed subject matter.

FIG. 5 illustrates an exemplary schema that may be employed for security deployments, communications, and configurations in accordance with the disclosed subject matter. Although the schema represents one possible manner in which to transfer data to and from an entity such as a user, interface, file, an automation component or associated network devices, it is to be appreciated that other possible data transfer mechanisms may be employed. For example, data can be transmitted in the form of binary or other type data packets that convey information in accordance with the disclosed subject matter.

Referring to FIG. 5, an example security analysis schema 500 is illustrated in accordance with an aspect of the disclosed subject matter. The security analysis schema 500 includes one or more XML elements 510 through 540 (defined by starting and ending tags with (</> symbols), arranged in substantially any order) that relate to one or more security items or data and provide information to facilitate security guidelines and configurations. Although not shown, the XML elements and associated tags can also include attribute information if desired, wherein an attribute is a name-value pair associated with an element start tag (e.g., <topology="PLC connected to gateway device having firewall protection">). The security analysis schema 500 can then be deployed to various systems and/or components to control/adapt network access based upon the security contents specified therein.

Proceeding to 510, a recommendations element can be provided having associated recommendations data. This can include suggestions as to how to adapt automation components and network devices for suitable security measures (e.g., in view of risk and cost criteria). In one example, a suggestion can be in the form of a statement "All real-time control devices and networks should only be connected to public networks via front-end server having virus detection, intrusion detection, and virtual private network capabilities." In another example, "Remote factory network devices must be identified, authorized, and authenticated before achieving access to control network, otherwise, local factory network devices should communicate with low-end encryption technologies." As can be appreciated, a plurality of such recommendations can be provided. In one or more embodiments, each recommendation can include an indication of a relative implementation cost associated therewith (e.g., up-front cost to implement the recommended countermeasure, expected degree of impact on overall system performance, etc.) At 514, a topologies element can be provided. This can include information on how to interconnect various devices and networks to achieve desired or recommended security goals (e.g., PLC connects to router, router connects to factory server and protected gateway . . . ). In another aspect, the topology data 514 can be in the form of symbols or codes that are employed to construct topology or network maps/displays via a visual or other type application.

At 520, configuration data can be provided. This type of data can include settings or parameters for adapting network components with suitable security measures (e.g., communications module word three should be set to value 03AA Hex for extended security checking, set dip switch two on gateway to cause authentication and authorization procedures with outside network devices, install virus detection software on network server . . . ). In another aspect, the configuration data can be sent or deployed to devices via the schema 500 and loaded to cause automatic configurations. At 524, an applications procedure element can be provided having associated procedure data. Such data can include the types of security applications to load, any security adjustments or settings relating to the applications, application status information to verify, and procedures for correctly operating respective security applications to mitigate potential attacks or threats.

At 530, policy data can be provided. The policy can be general and/or specific, applied system wide and/or to a device or subset of devices. For example location-based policies can be initiated (e.g., all network requests from listed URLs are to be denied, network requests from Pittsburgh server limited to 100 per day). Time-based policies can also be defined (e.g., no outside network requests allowed between 10:00 AM and 2:00 PM). Process-based policies can be defined such as, for example, "Limit outside network requests to below 50 during real-time batch operations." Such recommended policies can be generated based on factory description data (e.g., factory data 420) provided to the security analyzer describing the processes performed by the industrial system for which security is being assessed, as well as equipment in use to regulate the process. Using such information, the security analyzer can identify, for example, which devices or pieces of equipment comprising the automation system pose safety risks to personnel, and generate security policies directed toward minimizing the risk of improper operation of such dangerous equipment due to intrusive data traffic or network hijacks. The security analyzer can also identify critical phases of the automated process that carry a high risk of damage to the product or material being produced should a malicious intrusion cause the process phase to be executed abnormally (again, based on the factory description data 420 provided to the analyzer), and generate policies that increase the strength of security measures during these critical phases. These policies can also be generated by the security analyzer based on a calculated potential cost associated with a network intrusion, either in terms of personnel safety or impact on production or revenue, wherein the strength of a recommended process-based policy accords with the calculated potential cost of intrusion. According to one or more embodiments, the security analyzer 400 can compute these costs based on a stored knowledgebase of automation equipment and configurations thereof, as well automation applications and processes. This knowledgebase can include information regarding the risk levels associated with the respective items of equipment, system configurations, or processes. The security analyzer can parse the factory description data to identify the equipment in use, the operations being performed by the automation system, and any other relevant information. The analyzer can then cross-reference this parsed data with the knowledgebase of risk factors in order to determine the potential costs associated with the system intrusion, and generate policies commensurate with the calculated potential costs.

Other policies include load-based policies, whereby network requests that are responded to are regulated in accordance with a specified amount of desired network traffic (e.g., regulated according to requests/hour). In one or more embodiments, the amount of desired network traffic can be recommended by the security analyzer based on a calculated required level of security given the factory description inputs. For example, the security analyzer can determine that the factory description data suggests a low-risk system that poses little danger to personnel and relatively small risk of damaged product due to equipment malfunction, and accordingly can recommend a load-based policy that allows a comparatively high amount of network traffic. Conversely, if the factory description data suggests a plant operation carrying a potentially high cost associated with equipment intrusion, either in terms of safety or impact on production or revenue, the security analyzer can generate a load-based policy based on a relatively low amount of desired network traffic. Other policies may be related to the type of requests (e.g., all requests to write data to the PLC are to be denied, outside devices cannot update analog module configuration data, communications module to provide status data only, etc.). In general, substantially any policy that defines, regulates, and/or limits network activities in view of security considerations can be employed with the disclosed subject matter.

At 534, one or more security rules can be provided that have similar effects as the policies described above. For example, rules can be provided in an If/Then construct (can include else, else if, Boolean expressions and the like), wherein if a defined condition or conditions occur, then one or more listed actions result (can included nested constructs) (e.g., If more than 3 network access attempts are negotiated unsuccessfully, then deny further communications with node or address). At 540, user procedure data can be provided. This can include actual procedure data and/or links to databases or websites to acquire the data. Such data can instruct users on suitable security procedures, security precautions, training, configurations, examples, wizards, manuals, trouble shooting, emergency contacts, contact information, maintenance, and the like, which are designed to mitigate system security problems.

Figure 6:
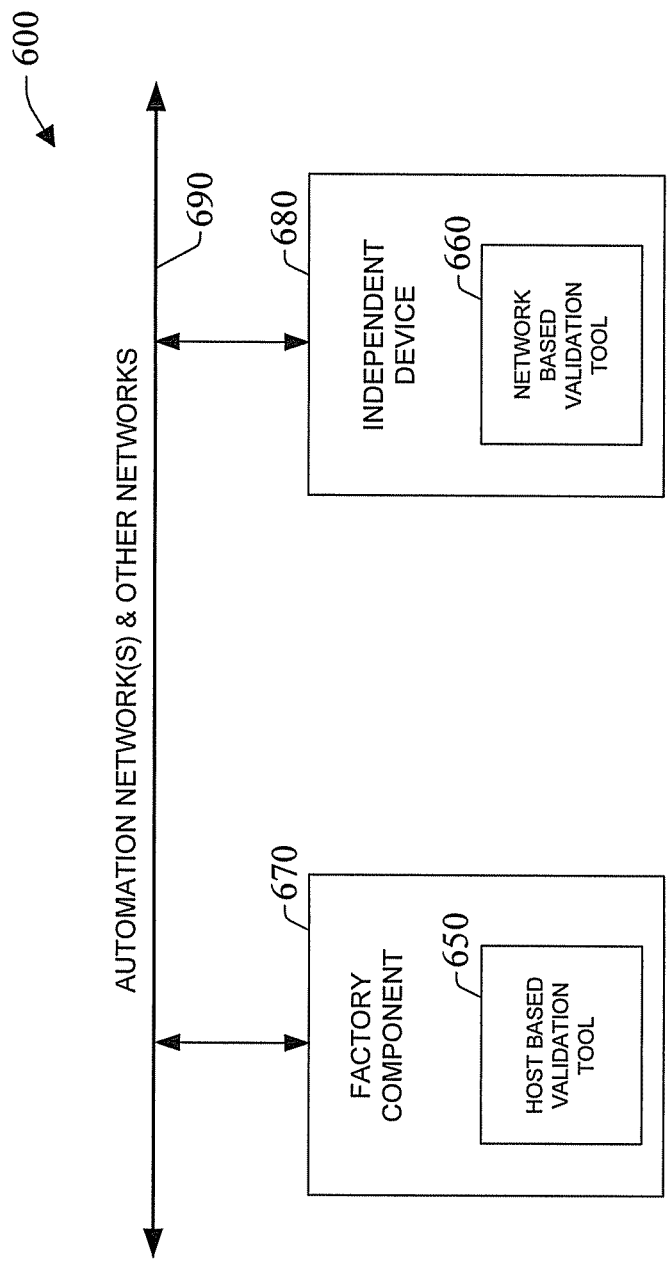
FIG. 6 is a diagram illustrating a validation system, methodology, and security validation tools in accordance with an aspect of the disclosed subject matter.

FIG. 6 illustrates a validation system 600, methodology, and validation tools 650, 660 in accordance with an aspect of the disclosed subject matter. The validation tools 650 and 660 perform initial and periodic live security assessments of a physical system. This enables security flaws or weaknesses to be identified. One aspect of the tools is to scan an automation system prior to proposed or attempted security modifications in order to assess current security levels. This can include, for example, auditing security settings for one or more network devices, verifying operation of security hardware and/or software in use, confirming that network paths to mission-critical automation assets are adequately secured, etc. Another aspect is to check the automation system for conformance to the recommendations of a security analysis tool described above, and/or against standards such as ISO, for example.

The validation tools 650 and 660 can be executed on end devices 670 (host based), and/or executed as an independent device 680 that is attached to a network 690 (network based) at selected points (e.g., security validation tool 118 of FIG. 1, which is depicted as residing on an independent networked server 116). One function of the host-validation tool 650 is to perform vulnerability scanning and/or auditing on devices comprising the automation system. This includes revision checks, improper configuration check, file system/registry/database permissions check, user privilege/password and/or account policy checks, for example.

Another function of the network validation tool 660 is to perform vulnerability scanning and auditing on firewalls, routers, and/or other security devices. In addition, a complementary tool can be provided to assess CIP-based factory automation systems for security (includes substantially any factory protocol). This will typically be a network-based tool, since factory automation devices often are not as capable as general purpose computing devices. The network validation tool 660 can also be operable in an assessment mode to discover system flaws with little or no configuration, and the tool can operate in a validation mode to check system security against security analysis methodology determinations described above. Still other functions can include non-destructively mapping a topology of IT and automation devices comprising the automation system, checking revisions and configurations, checking user attributes, and/or checking access control lists. The validation tools described herein can also be adapted to automatically correct security problems (e.g., automatically adjust security parameters on network devices or automation equipment to conform to a recommended security standard, install new security components, remove suspicious components, and so forth). It is to be appreciated that one or more of the functions described herein for the host validation tool 650 may be shared/interchanged with the network validation tool 660, and vice versa.

Figure 7:
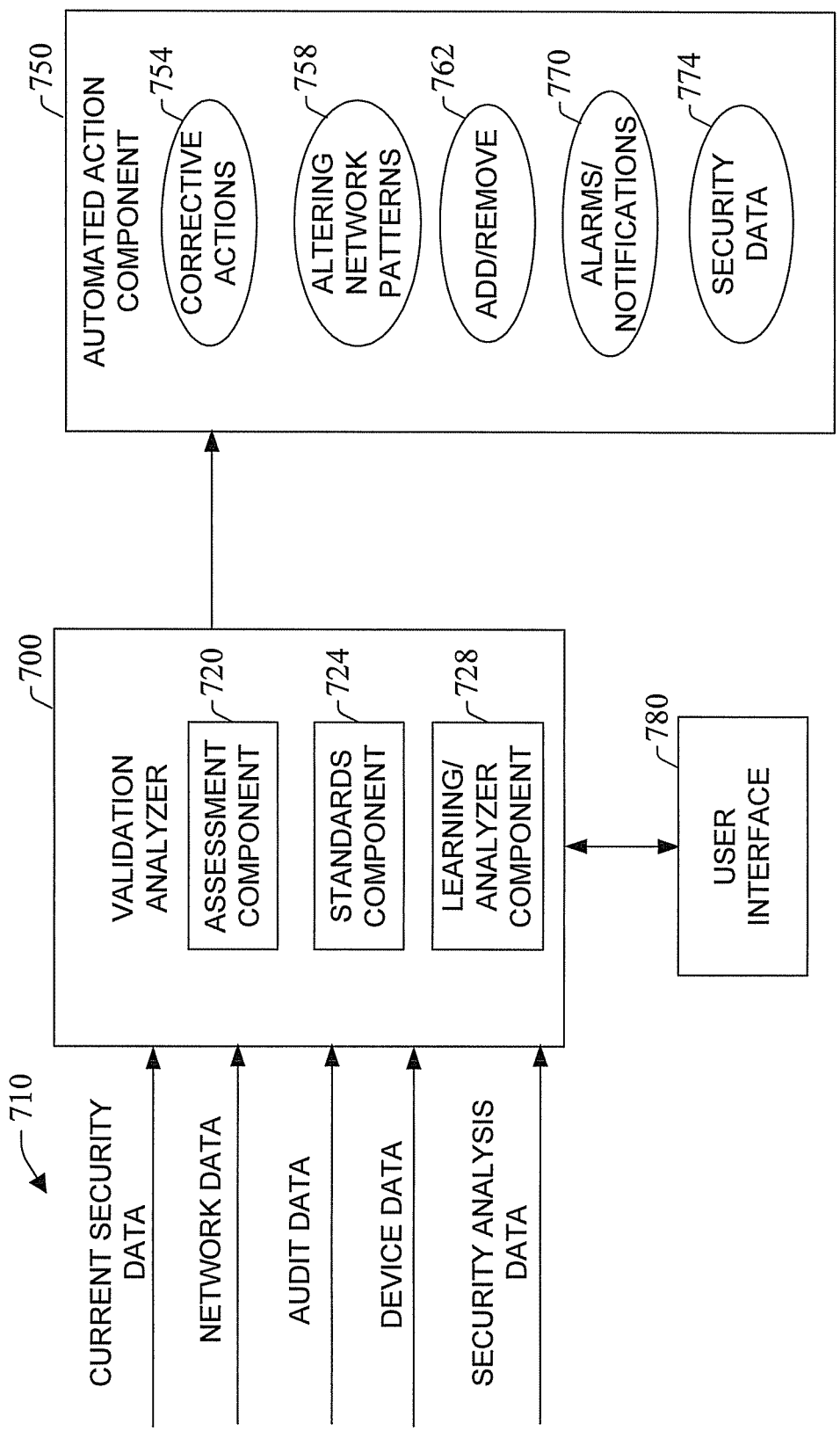
FIG. 7 is a schematic block diagram illustrating a validation analyzer in accordance with an aspect of the disclosed subject matter.

Referring now to FIG. 7, a validation analyzer 700 is illustrated in accordance with one or more aspects of the disclosed subject matter. The validation analyzer 700 can be a hardware device, computer, processor, application, and/or combination thereof that process one or more security data inputs 710 such as can be received or communicated from a network (not shown). The security data inputs 710 include current security data, network data, audit data, device data, security analysis data, and/or other data that can be derived from scanning or querying a network and associated devices via the validation analyzer 700 for information regarding current network security conditions. Various components can be provided with the validation analyzer 700 to facilitate security monitoring and processing. In one aspect, an assessment component 720 can be provided. The assessment component 720 performs initial and/or periodic security determinations on network systems to identify security deficiencies or problems therein. For example, the assessment component 720 may compare a stored security configuration with a network configuration received from the security data inputs 710, flag such conditions, and/or institute further actions if differences are detected.

In another aspect, a standards component 724 can be provided to perform security compliance checking. This can include polling the plant and/or office network and the devices connected thereto prior to proposed or attempted network security modifications in order to assess current security levels. Compliance checking can also include determining conformance to other automated security analysis recommendations (such as those generated by the security analysis tool as described supra), conformance to applicable device/network security standards, and/or conformance with predetermined or factory-specific standards, for example. Such checking can be in accordance with stored standards or procedures within the validation analyzer 700, or can include remote checking to such resources as network databases, web sites, web services (e.g., databases linked to Internet Protocol Security Standard, IEEE database) to ascertain a most recent recommended standard. It is noted that the assessment component 720 and/or standards component 724 can initiate vulnerability scanning and/or auditing on devices/networks/systems. This can include software or firmware revision checks, improper device configuration checks, file system/registry/database permissions checks, user privilege/password and/or account policy checks, checking for susceptibility to network-based attacks, searching for open network ports, scanning for vulnerable network services, learning identity information about end devices/users that may enable attack entry, performing vulnerability scanning and auditing on firewalls, routers, and/or other security devices or components, non-destructively mapping a topology of network devices, checking revisions and configurations, checking user attributes, and/or checking network/device access control lists. As can be appreciated, such checking can include comparisons to local/remote databases or sites as noted above.

In yet another aspect of the disclosed subject matter, a learning/analyzer component 728 can optionally be provided within the validation analyzer 700. This component can be adapted to learn network, device, and/or system patterns, scan current network data, and process the current network data in accordance with the learned patterns to determine if automated actions are to be initiated. The learning/analyzer component 728 will be described in more detail below with respect to FIGS. 8-16.

If a security issue or problem is detected by the assessment component 720, standards component 724, and/or learning/analyzer component 728, the validation analyzer 700 can trigger an automated action component 750, whereby one or more automated security actions can be initiated. The automated security actions can include automatically correcting security problems at 754, such as automatically adjusting security parameters; altering network traffic patterns at 758 (e.g., increasing/decreasing communications with a node); installing new security components and/or removing/disabling suspicious components at 762; triggering alarms; and/or automatically notifying entities about detected problems and/or concerns at 770, and/or generating security data at 774 such as generating an error or log file, generating a schema, generating data to re-configure or re-route network connections, updating a database or remote site, for example. As illustrated, the validation analyzer 700 can be configured and interacted with via a user interface 780 having similar input and output functionality as described above with respect to the user interface depicted in FIG. 3.

Figure 8:
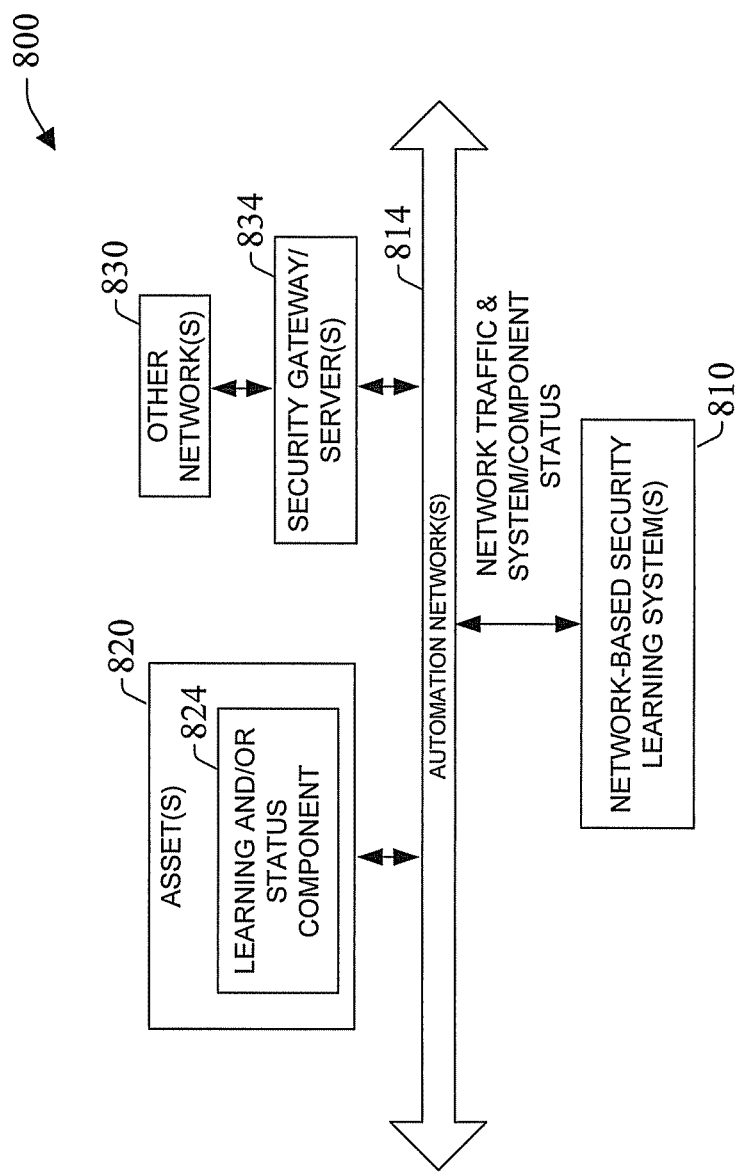
FIG. 8 is a schematic block diagram illustrating a security learning system in accordance with an aspect of the disclosed subject matter.

FIG. 8 illustrates a security learning system 800 in accordance with an aspect of the disclosed subject matter. The security learning system 800 can include network-based aspects and/or host-based aspects similar to some of the security aspects described above with respect to FIG. 7. A network-based security learning system 810 (also referred to as learning component 810) is provided that monitors an automation network 814 and devices thereon during a predetermined training period (e.g., monitor network activities for 1 month).

During the training period, the learning component 810 monitors and learns activities or patterns such as:
  The number of network requests to and from one or more assets 820;
  the type of requests (e.g., read/write, role/identity of person/system requesting access, time of requests);

status or counter data (e.g., network access counters, error codes) which can be provided or queried from a learning or status component 824 within the asset 820; and/or monitor and learn about substantially any data type or pattern that may be retrieved from the network 814 and/or the asset 820.

Network activities can also include network requests that are received from outside networks 830 that may be routed through a security gateway or server 734 before reaching the automation network 814.

After the training period, the learning component 810 monitors the automation network 814 and/or assets 820 for detected deviations from data patterns learned during the training period. If desired, a user interface (not shown) can be provided, through which one or more pattern thresholds can be adjusted. The user interface can also provide options for specifying the type of data patterns to monitor/learn. For example, if the number of network requests to the asset 820 has been monitored and learned to be about 1000 requests per hour during the past month, then a threshold can be set via the user interface that triggers an alarm or causes an automated event to occur if a deviation is detected outside of the threshold (e.g., automatically disable all network requests from the other networks 830 if the number of network requests to the asset 820 exceeds a set or determined percentage of the average daily network requests detected during the training period).

In one aspect, the learning component 810 and associated detection parameters or thresholds can be provided as a network-based tool or tools that can reside at various portions of the automation network 814. In another aspect, the learning component can be provided as a host-based component as illustrated at 824, depending on the resources available for the asset 820.

Various learning functions and/or processes can be provided to facilitate automated learning within the learning components 810 and 824. This can include mathematical processes, statistical processes, functions, and/or algorithms, and can include more elaborate systems such as a neural network, for example. In addition, artificial intelligence functions, components and/or processes can be provided. Such components can include automated classifiers for monitoring and learning data patterns, wherein such classifiers include inference models, Hidden Markov Models (HMM), Bayesian models, Support Vector Machines (SVM), vector-based models, decision trees, and the like.

Figure 9:
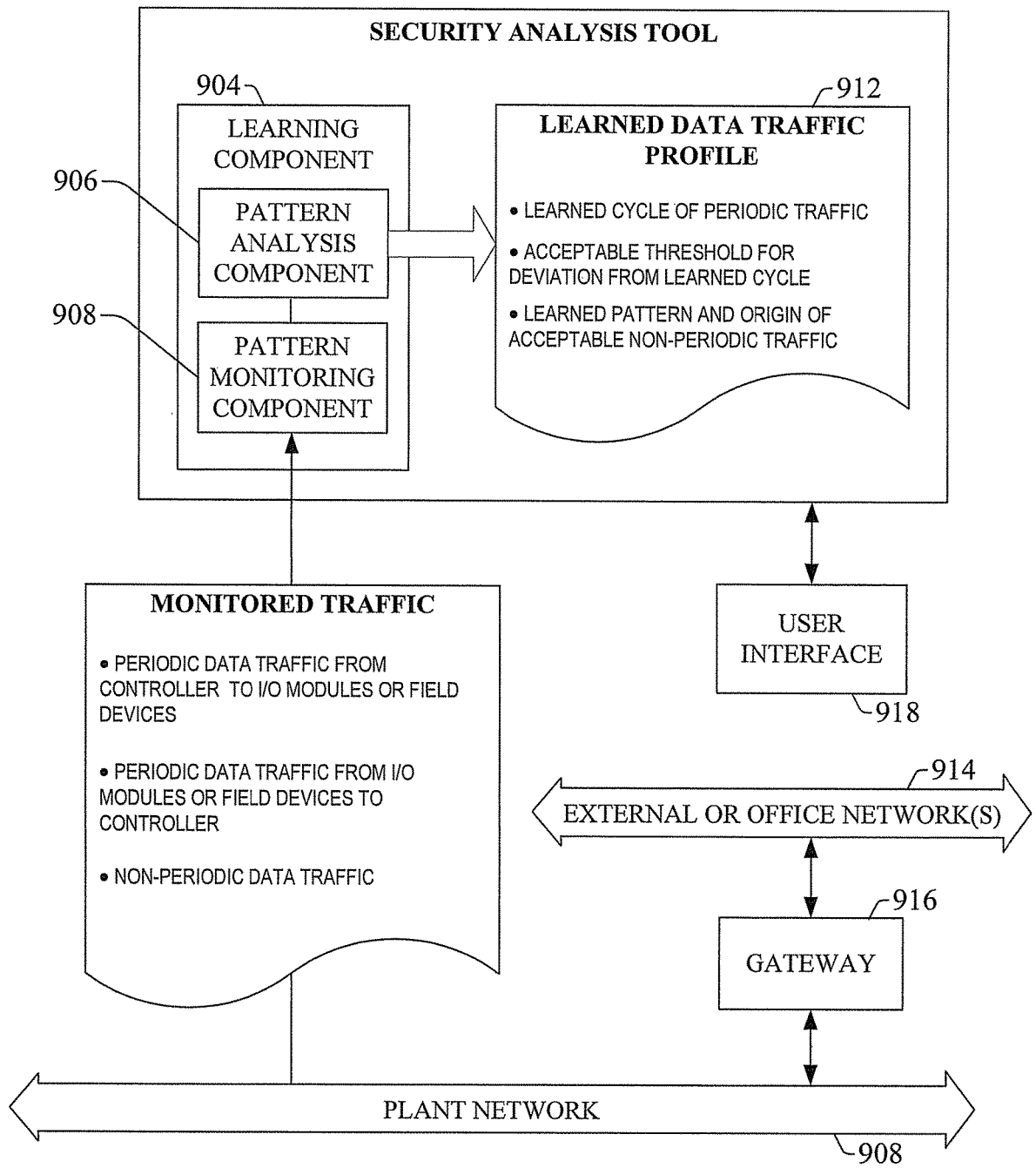
FIG. 9 is a block diagram illustrating the creation of a learned data traffic profile by a learning component.

During the training period, the learning component can monitor both data traffic on the automation network and network-related activities carried out by the automation assets themselves over time in order to create a learned data traffic profile and a learned asset activity profile. FIG. 9 illustrates the creation of a learned data traffic profile in more detail. As discussed above, the security analysis tool 900 of the present disclosure can include a learning component 904 that monitors data traffic on the plant network during the training period, e.g., using pattern monitoring component 908. Advantageously, pattern monitoring component 908 can monitor the network traffic in a manner that considers the unique operations and data traffic patterns of automation systems in general. For example, during the training period, pattern monitoring component 908 can monitor the periodic data traffic between a controller on the network (e.g., a PLC, PAC, etc.) and the I/O modules or field devices that interface with the controller over the plant network 908. Aspects of the disclosed subject matter recognize that such periodic traffic is common to many automation systems by virtue of the controller's sequence of operation, and is a property that distinguishes many automation networks from more common home or office networks. Accordingly, one or more embodiments of the learning component described herein are configured to take advantage of this aspect of the plant network.

Figure 10:
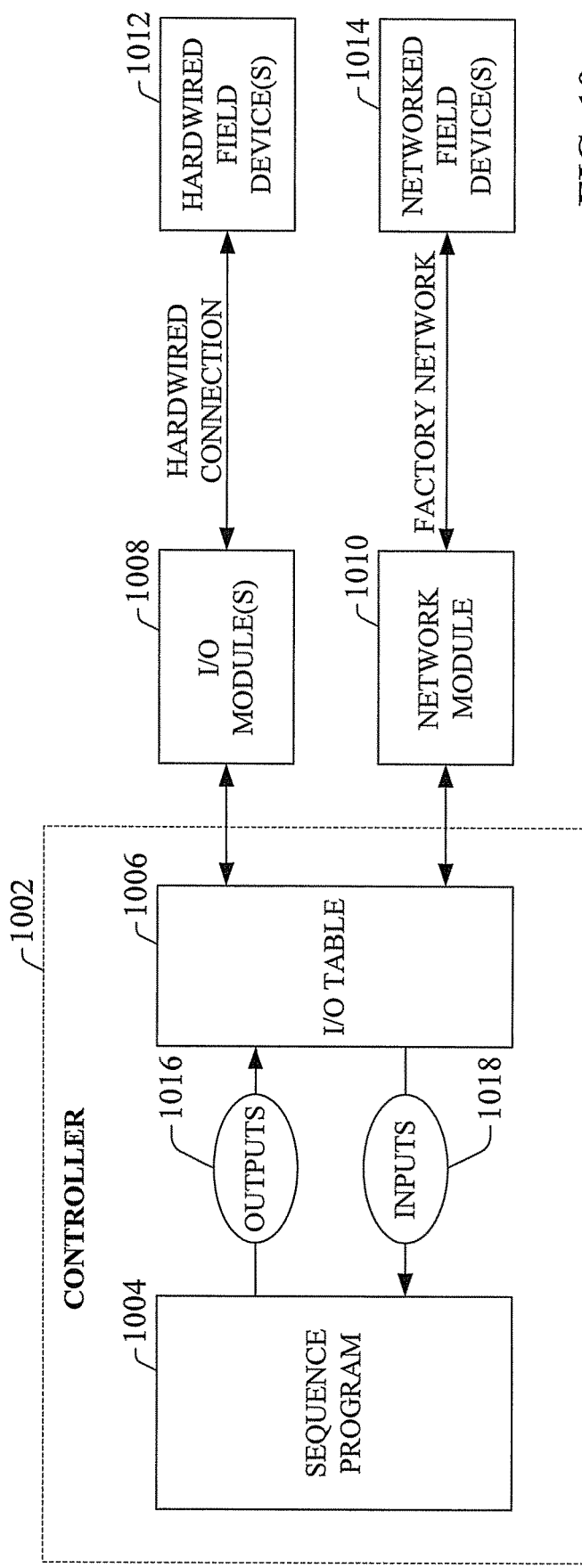
FIG. 10 is a block diagram illustrating exchange of input and output data between a controller and various field devices.

The periodic I/O updates inherent to many automation networks are explained in more detail with reference to FIG. 10. Industrial controller 1002 (similar to controller 104 of FIG. 1) executes sequence program 1004 in order to regulate the industrial process. As described above, controller 1002 interfaces with one or more I/O modules 1008, which include any combination of digital and analog input and output terminals for exchanging data with field devices 1012 over a hardwired connection. I/O modules 1008 can comprise either local I/O modules that share a rack or chassis with the controller and interface with the controller 1002 over a backplane (e.g., local I/O modules 110 of FIG. 1), or remote I/O modules that interface with the controller over the network (e.g., remote I/O modules 114 of FIG. 1). Controller 1002 can also exchange data with networked field devices 1014 directly over the factory network via a network module 1010.

As noted above in connection with FIG. 1, an I/O table 1006 in the controller's memory can maintain the values of the controller inputs and outputs. That is, input values read from input modules or from the networked field devices are stored in I/O table 1006, from which the input values 1018 can be read into sequence program 1004. Likewise, output values 1016 generated by the sequence program 1004 are written to I/O table 1006, and subsequently or concurrently sent to the output modules to be transmitted as output signals to the field devices.

Figure 11:
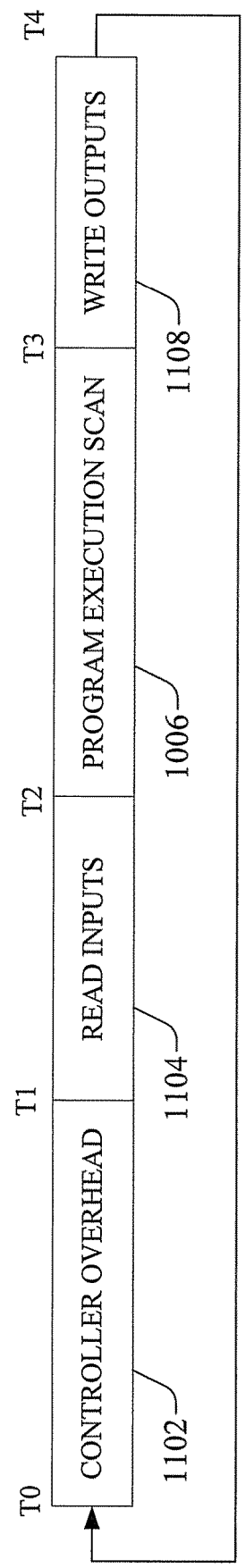
FIG. 11 is a timing diagram illustrating a common sequence of operations for an industrial controller.

Turning briefly to FIG. 11, a typical sequence of operations for the controller is illustrated as a timing diagram. This sequence of operations is executed continuously while the controller is in run mode in order to regulate the automation system in accordance with sequence program 1004. From time T0 to T1, controller overhead 1102 (e.g., integrity checks, program verification, error handling, etc.) is performed. From T1 to T2, input signals at the I/O modules are scanned into the I/O table 1006 as input values and provided to the sequence program. From T2 to T3, an execution scan is performed on the sequence program, which can cause one or more output values to be updated. From T3 to T4, the output values, which may have altered during the program execution scan, are written to the output modules for transmission to the field devices. Upon completion of the output write, the sequence returns to T0 and repeats.

As can be seen, this sequence of operations can result in a substantially periodic exchange of data between the controller and I/O modules and/or networked field devices, since the inputs are read and outputs written at substantially regular intervals dictated by the overall time required to complete the sequence. Returning now to FIG. 9, the learning component 904 can leverage this aspect of the automation data traffic during the training period by target monitoring the substantially periodic data traffic between the controller and the I/O modules or field devices. Learning component 904 can perform this monitoring by any suitable means, including observing the data traffic directly, monitoring values in a controller or other device representing commands to open a connection, reading a controller's internal design file, etc. A pattern analysis component 906 of the learning component 904 can then generate a learned data traffic profile 912 based in part on this monitored data. The learned data traffic profile 912 can encode the learned cycle of periodic traffic gleaned through the monitoring of traffic between the controller and the I/O modules and/or field devices. The learned data traffic profile can also encode one or more acceptable thresholds of deviation from this learned pattern based on variations in the cycle observed by the pattern analysis component 906 during the training period. These thresholds can be generated automatically by the pattern analysis component 906 based on the observed variations, or configured manually via user interface 918. Calculated thresholds can also be modified or overridden manually via the user interface.

In addition to this periodic data traffic, the pattern monitoring component 908 of learning component 904 can detect allowable non-periodic data traffic placed on the network during the training period. Such non-periodic data traffic can include, but is not limited to, communications to and from external or office networks 914 (e.g., via gateway 916) data traffic associated with a maintenance or upgrade procedure, data generated by automation or network devices that initiate communications with other devices on an as-needed basis, etc. The learning component 904 can identify the sources of these allowable non-periodic communications and include this information in the learned data traffic profile 912.

The learned data traffic profile 912 generated by the learning component can encode any suitable information that describes the learned pattern of network traffic at a high degree of granularity, including time- and location-based correlations. For example, the pattern analysis component 906 can observe that network transfers between two devices increases by a generally predictable amount between 10:00 and 11:00 each weekday. This observation can be recorded in the profile 912 and subsequently used by the learning component to determine the boundaries of acceptable network activity. The pattern analysis component can also calculate a threshold to be used by the learning component when subsequently monitoring the traffic between the two devices during this time period based on the observed variations in network load during the training period. Thus, the pattern analysis component can calculate variable thresholds for segments of the plant network as a function of the time of day based on the observed patterns. Such variable thresholds can be particularly applicable to industrial systems designed to place unneeded sets of devices in a sleep mode during scheduled times of day in order to conserve energy. During sleep mode, most or all data traffic to the sleeping devices will halt. The pattern analysis component can observe and learn this daily decrease in network traffic to the sleeping devices, and vary the threshold for that portion of the system during the sleep period accordingly. Given that any data traffic to the sleeping devices during sleep mode has a higher likelihood of originating from an unauthorized outside source, reducing the threshold during this sleep mode increases the sensitivity to detected data traffic and increases the likelihood of a corrective response in response to such traffic.

Moreover, the pattern analysis component 906 can independently assess data traffic patterns for different segments of the network (e.g., segments corresponding to different areas of the plant, different machine cells, different controlled processes, etc.). In one or more embodiments, the learning component 904 can determine which portions of the plant network 908 correspond with respective work cell areas, industrial processes, etc. based on the factory description information provided to the security analysis tool described above. The pattern monitoring component 908 can then use this correlation between network segments and plant areas to determine a monitoring strategy whereby the segments are monitored and analyzed individually as well as collectively. In such scenarios, the learned data traffic profile 912 can maintain individual learned profiles and thresholds for the respective segments.

Figure 12:
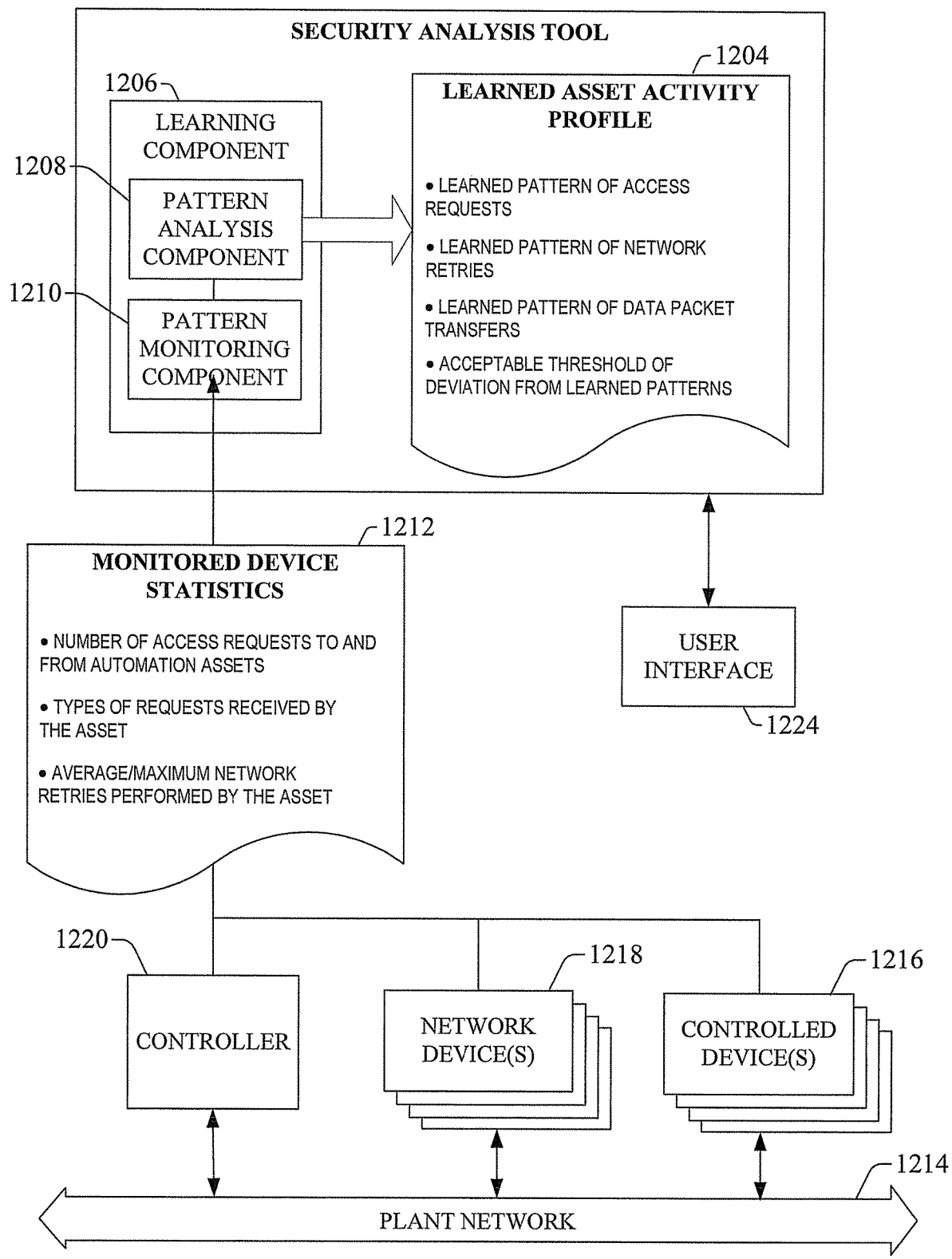
FIG. 12 is a block diagram illustrating creation of a learned asset activity profile by a learning component.

As noted above, one or more embodiments of the learning component described herein can also create a learned profile based on data gathered by monitoring network-related activity of the automation assets themselves during the training period. FIG. 12 illustrates creation of such a learned asset activity profile according to one or more embodiments of the disclosed subject matter. In this example, the pattern learning component 1210 of learning component 1206 can monitor one or more automation assets connected to plant network 1214. For example, the pattern monitoring component can monitor controller 1220 (e.g., over network 1214) during the training period, and in particular can monitor such events as the number of network connection retries performed by the controller over that period, the number of network access requests received by the controller, a number of unrecognized messages received by the controller or an I/O module, or other such statistics. Likewise, the pattern monitoring component 1210 can monitor traffic statistics recorded by network devices 1218, such as routers, hubs, switches, or other network architecture devices. This can include monitoring the number of packets received or transmitted by the network devices, the number of collisions, the percentage of bandwidth utilized, or other such statistics.

Pattern monitoring component 1210 can also monitor the controlled devices 1216 during the training period. As noted supra, some automation devices can be regulated by controller 1220 through a direct network connection (e.g., over plant network 1214). Since such devices are placed on the plant network, communication statistics for such devices can be monitored by the learning component 1206 and encoded within the profile. Such networked automation devices can include, for example, variable frequency drives (VFDs) for motor control, industrial robots, vision cameras, solenoids for pneumatic control, or virtually any other networked industrial device or piece of equipment.

In addition to monitoring communication-related activity for the controller 1220 and devices 1218 and 1216, one or more embodiments of the learning component 1206 can also retrieve and record inherent or static information associated with the respective devices, such as MAC addresses, IP addresses, checksums, etc. For example, the Security Analysis Tool can reference recorded MAC address and IP address data during subsequent security monitoring of the automation system to determine if, for example, an entity is attempting to hijack a device identity by asserting an identical IP address as an existing network device or controller (e.g., the entity is claiming an unauthorized association between a MAC address and the IP address). The Security Analysis Tool can also reference the recorded checksums during security monitoring to determine whether an attempt has been made to alter a device's configuration.

During or after the training period, the learning component's pattern analysis component 1208 can generate a learned asset activity profile 1204 that encodes the asset activity patterns described above. The learned asset activity profile 1204 can contain such information as a learned pattern of network requests or retries associated with the respective controllers and devices on the network, a learned pattern of packet transfers to and from the respective devices, or other such network-related activity that can be collected from the devices comprising the automation system. The learned asset activity profile 1204 can also include one or more acceptable thresholds of deviation from the respective learned activity patterns. These thresholds can be calculated by the pattern analysis component 1208 based in part on the average amount of statistical variation observed by the learning component during the training period. As with the thresholds calculated for the learned data traffic profile, the thresholds can also be manually configured by the user; e.g., via user interface 1224. Additionally, the learned asset activity profile can encode relevant static or inherent data about the monitored assets, such as IP address, MAC addresses, checksums, etc. Although the learned asset activity profile 1204 is described herein as separate profile from the learned data traffic profile 912 of FIG. 9, it is to be appreciated that the data encoded in both profiles can be compiled into a single composite profile of learned activity for the automation system.

Figure 13:
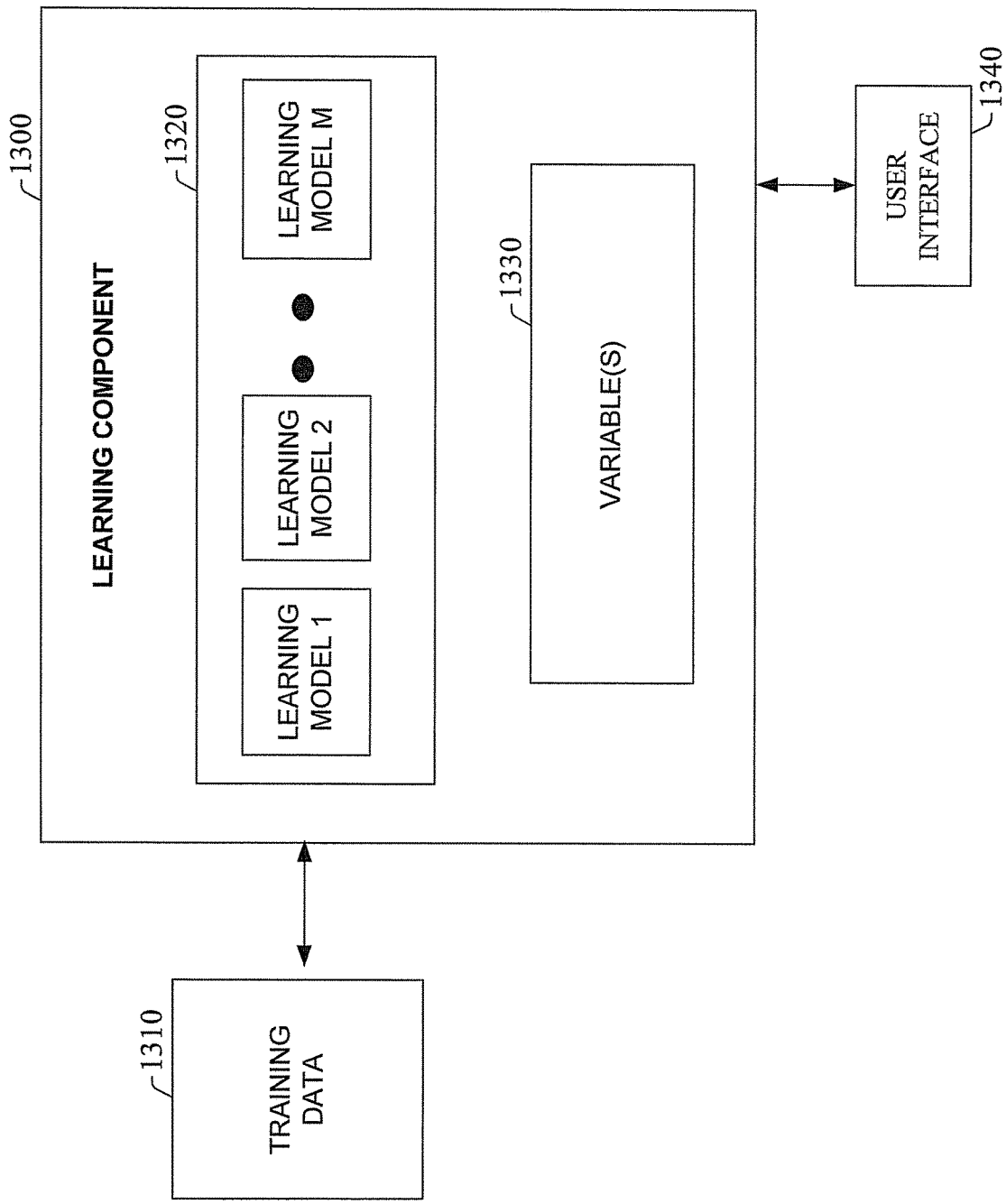
FIG. 13 is a diagram illustrating a learning component in accordance with an aspect of the disclosed subject matter.

FIG. 13 depicts a learning component 1300 that employs learning models and variables for processing training data according to one or more embodiments of the disclosed subject matter. As discusses supra, learning component 1300 receives a training data set 1310 derived by monitoring network or device activities over a predetermined timeframe (e.g., the training period). In order to process the training data 1310, the learning component 1300 includes one or more learning models 1320 and/or learning variables 1330. The learning models 1320 can include such aspects as neural network functions, inference models, mathematical models, statistical models, probabilistic models, classifiers, and so forth that learn network patterns or occurrences from the training data 1310. It is also noted that the learning models can be adapted similarly (e.g., all models configured as Hidden Markov Models) or adapted in various combinations (e.g., 40 models configured as a neural network, 3 models adapted in a Bayesian configuration, 1 model configured as a vector-based classifier). The learning variables 1330 can be focused on selected events or circumstances. For example, a network load variable may record the average number of outside network requests per hour. In another example, a PLC variable may record the average number of network retries that an associated PLC experiences in a given timeframe, whereas another PLC variable records the maximum number of network retries that the PLC experienced during the same timeframe. In another aspect, the learning variables 1320 may be employed as counters to record amounts for various events (e.g., record the number of PLC network transfers to I/O device over the last hour). As can be appreciated, a plurality of such variables can be defined and updated to log various network events during a selected training period. These learning variables can be created and configured via user interface 1340. For example, through user interface 1340, a user can define a variable to monitor a tag in an industrial controller that records the number of access requests received by the controller. The learning component can then monitor this tag in view of one or more of the learning models 1320 and thereby generate a learned pattern of access requests. The user interface 1340 can also be used to create or modify the learning models as needed. After training, the learning component 1310 stores learned patterns or events (e.g., the learned data traffic and asset activity profiles described above in connection with FIGS. 9 and 12) that are then employed by a learning analyzer component described below to monitor and detect network security problems or identify potential security issues.

Figure 14:
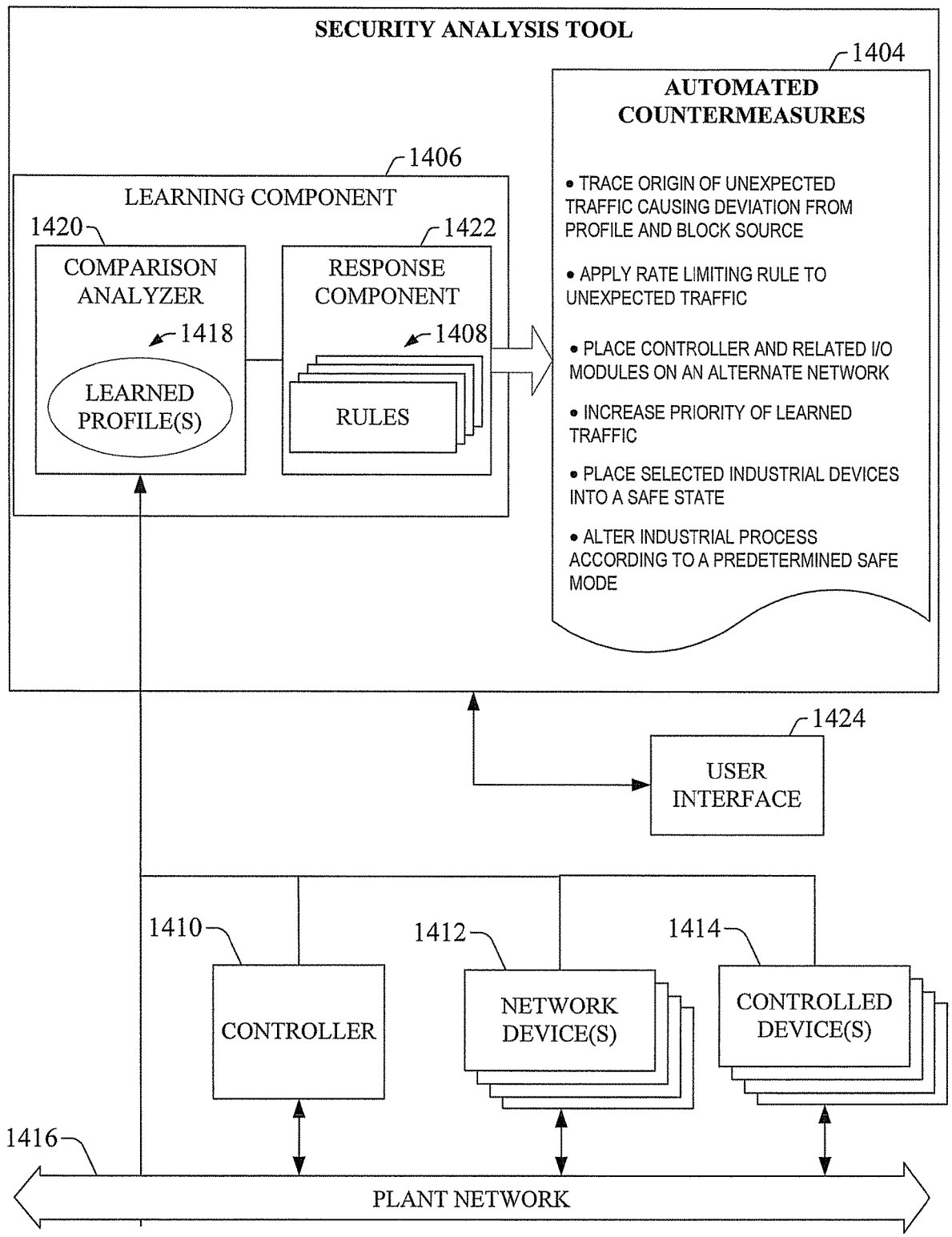
FIG. 14 is a block diagram illustrating the generation of automated countermeasures by a learning component in response to detected deviations from learned patterns.
Figure 16:
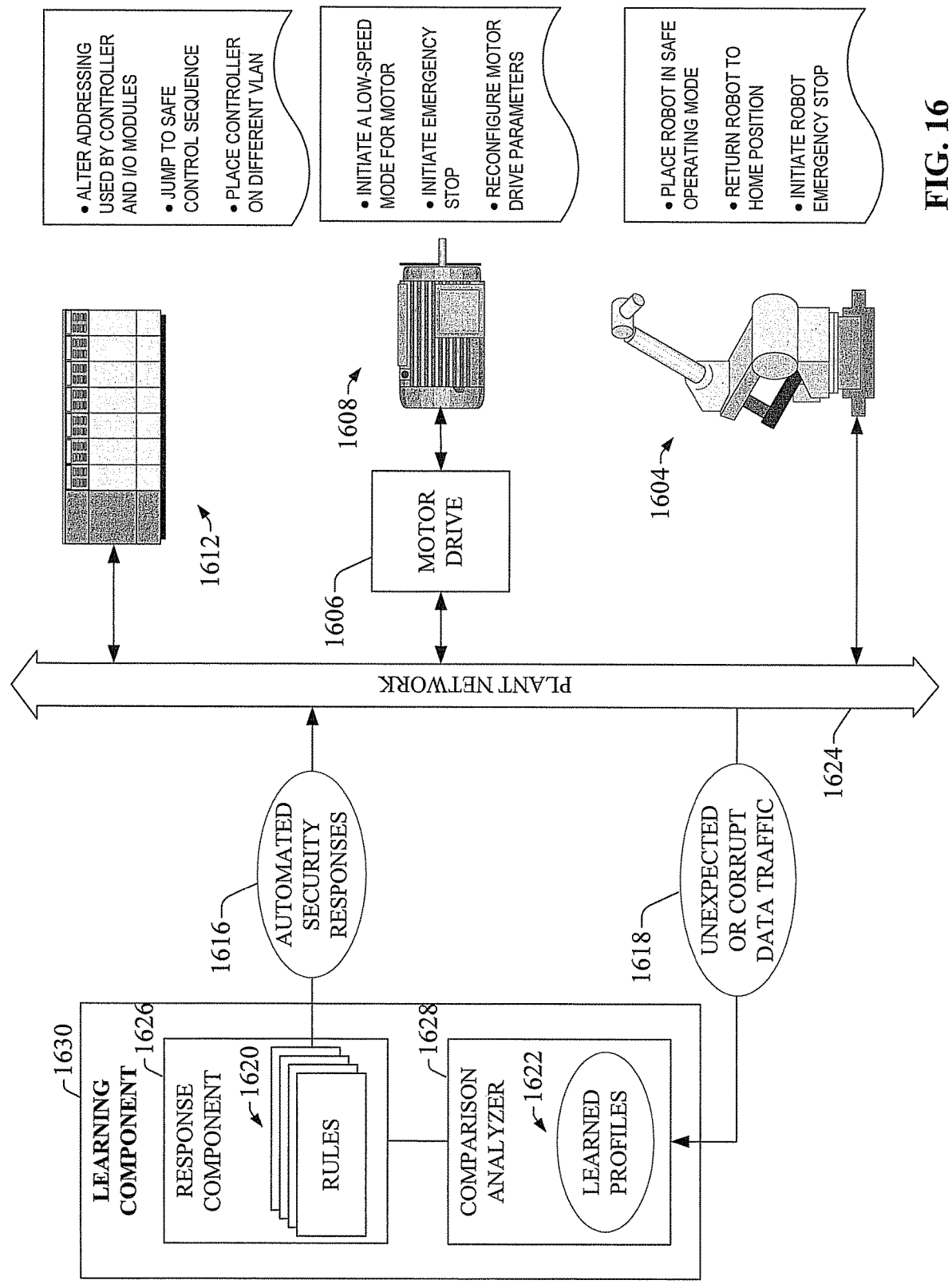
FIG. 16 is a block diagram illustrating exemplary security countermeasures initiated by a learning component and targeted to industrial automation devices on a plant network.

FIG. 14 illustrates the generation of automated countermeasures by the learning component in response to detected deviations from the learned patterns subsequent to the training period. After the training period is completed and the learned profiles 1418 (e.g., learned data traffic and asset activity profiles) have been generated, a comparison analyzer 1420 can begin monitoring the industrial system in view of the learned profiles 1418. This can include monitoring the data traffic on plant network 1416 to identify deviations from the learned data traffic patterns in excess of the threshold(s) encoded in the learned profile(s) (e.g., the learned data traffic profile 912 of FIG. 9). In one or more embodiments, the comparison analyzer 1420 can monitor in particular the data traffic between the controller 1410 and its associated I/O modules (including remote I/O modules that interface with the controller 1410 across the plant network 1416), or between the controller 1410 and networked controlled devices 1414. As discussed above in connection with FIGS. 10 and 11, this data traffic is typically substantially periodic due to the cyclic nature of the controller operations. The comparison analyzer 1420 can compare the monitored cycle time of this data traffic with the average cycle time calculated during the training period and encoded in the learned data traffic profile. If the monitored cycle time deviates from the learned cycle time encoded in the learned profile, a response component 1422 can output one or more appropriate countermeasures 1404, to be discussed in more detail infra. For example, insertion of additional undesirable data traffic on plant network 1416 could cause a delay in the periodic I/O updates from controller 1410. If the comparison analyzer determines that the I/O updates are occurring at longer intervals in excess of the acceptable deviation threshold for I/O updates, an automated countermeasure will be generated by the response component 1412. As an exemplary countermeasure, the response component 1422 can force controller 1410 and its associated I/O modules to switch to an alternate communication channel (if available) or a different virtual local area network (VLAN). Another exemplary countermeasure can comprise increasing the communication priority of the learned data traffic between the controller and the I/O modules relative to detected unexpected data traffic. This can be done, for example, by identifying the network switch(es) through which the controller and its I/O modules attach to the network and configuring the switch(es) to increase the priority of the learned traffic. In another countermeasure scenario, the response component 1422 can reconfigure one or more network devices to reroute the data traffic between the controller and the I/O modules to an alternative network path that does not share bandwidth with unlearned or suspicious data traffic detected by the comparison analyzer 1420 (acting on the assumption that the unlearned data traffic is consuming bandwidth required for the I/O updates). The learning component 1406 is thus configured to target its monitoring of the network based on the unique data traffic characteristics inherent in many industrial automation systems (e.g., by focusing a portion of its monitoring on the data traffic between the controller 1410 and its associated I/O modules or controlled devices), and to tailor its learning and response functions in view of these expected data traffic patterns.

Since the learned profile(s) 1418 can also encode learned allowable non-periodic data traffic during the training period as well as the source of such non-periodic traffic, the comparison analyzer 1420 can identify data traffic originating from an unauthorized source that could adversely affect the system, either deliberately or unintentionally. For example, if a predetermined amount of unknown data traffic from an unlearned source is detected by the comparison analyzer 1420 (where the predetermined amount can be encoded in the learned profile(s) as a threshold defined for traffic of unknown origin), the comparison analyzer 1420 can instruct response component 1422 to implement a countermeasure defined for such an event. Such countermeasures can include, but are not limited to, blocking the source of the unknown traffic, blocking a port in a network switch, implementing an access rule in a router that reduces or filters the unexpected data traffic, applying a rate limiting rule to traffic originating from the unknown source, increasing a priority of the learned data traffic with respect to the unexpected data traffic, or other appropriate countermeasures.

Comparison analyzer 1420 can also monitor controller 1410, network devices 1412, and controlled devices 1414 directly in order to identify deviations from the learned patterns of asset activity as encoded in the learned profile(s) 1418 (e.g., learned asset activity profile 1204 of FIG. 12). As with monitoring of data traffic on the network, potential security issues can be identified based on a comparison of monitored activity with the learned profile(s) 1418 generated during the training period. This can include, for example, detecting when an average number of network retries initiated by the controller exceeds the learned pattern of network retries in excess of the threshold associated with that measure. The learning component 1406 can also monitor the controller 1410 and identify when a frequency of attempts to access the controller exceeds a learned frequency as encoded in the learned profile(s) 1418, and trigger a predefined countermeasure associated with this contingency. Other network activity that can be detected by the comparison analyzer, and for which countermeasure can be triggered, can include an excessive number of denial of service messages from the controller 1410, repeated forced re-opening of a connection between the controller 1410 and another device, a number of concurrent open communication connections in excess of a threshold, occurrence of a communication connection between a controller and a device being closed and a new connection to the device being opened from a new source, etc.

In order to detect attempts to hijack assets on the network, one or more embodiments the comparison analyzer 1420 can also monitor for duplicate IP addresses on the network, which can indicate an attempt by an entity to claim an IP address from a network device. In some cases, such an entity can assert that its MAC address should be associated with the IP address being claimed. If this attempt to claim the IP address is successful, the unauthorized entity can assume control of the portion of the industrial process that should be performed by the device originally associated with the hijacked IP address. The comparison analyzer 1420 can monitor for such attempts by detecting when an IP address previously associated with a first MAC address has become associated with a second MAC address.

Comparison analyzer 1420 can also detect unauthorized attempts to alter a device's configuration or software settings by periodically comparing a checksum associated with a device with the corresponding checksum recorded during the training period (as discussed supra). If a difference is detected, an appropriate predetermined countermeasure can be initiated (as discussed in more detail below).

One or more embodiments of the comparison analyzer 1420 can also identify attempts to inject unauthorized packets onto the network 1416. These can include improperly formatted packets addressed to a device (e.g., the controller, an I/O device, etc.) in an attempt to induce excessive processing at the target device, thereby slowing the responsiveness of the device and adversely affecting the controlled process. Unauthorized packets detectable by the comparison analyzer 1420 can also include properly formatted packets having valid connection identifiers and transaction identifiers recognizable by the target network device, but which originate from an unlearned source and which attempt to alter an input or an output of a device.

In addition to detecting suspicious data applied to the network from an unlearned source, the learning component 1406 can also detect excessive data originating from a known source. Although such data may not be malicious, if directed at the controller, these excessive messages may cause the controller to spend excessive time processing the messages, thereby compromising control of the automation system. Accordingly, the response component 1422 can respond to detection of such excessive data traffic and generate a predefined response (e.g., apply a rate limiting rule to the known source of the data, instruct the controller to switch to an alternate communication channel or VLAN, etc.).

The countermeasures 1404 generated by the response component 1422 for a given security problem can be determined in part by a set of countermeasure rules 1408 associated with the learning component 1406. According to one or more embodiments, the learning component 1406 can allow a user to pre-configure one or more selected countermeasures for each security scenario to be monitored; e.g., via user interface 1424. For example, a rule can be configured instructing the learning component that, in the event that excessive data traffic originating from an unknown source is detected by the comparison analyzer 1420, the response component 1422 is to apply a rate limiting rule to data originating from the unknown source. Another rule can stipulate that the controller is to be placed on a specified alternate communication channel if the periodicity of the data traffic between the controller and its associated I/O modules or controlled devices deviates from the learned pattern. In one or more embodiments, countermeasure rules can take the form of "IF-THEN" statements, where the "IF" conditions corresponding to various security concern scenarios can be matched with respective "THEN" instructions corresponding to a selected countermeasure, as illustrated in FIG. 15.

Advantageously, the learning component can allow multiple prioritized countermeasures to be pre-configured for a given security problem. This can ensure that increasingly aggressive countermeasures are applied to the identified security problem until the detected problem has been mitigated (as determined by the comparison analyzer 1420). For example, when configuring a countermeasure rule for the scenario in which the comparison analyzer 1420 identifies excessive data traffic from an unknown source, a user may configure a "first response" countermeasure (e.g., increase the communication priority of the learned network traffic with respect to the network traffic originating from the unknown source), a "second response" countermeasure (e.g., apply a rate limiting rule to the unknown source), and a "third response" countermeasure (e.g., block the unknown source). When the comparison analyzer 1420 subsequently detects that a rate of data traffic from an unknown source exceeds an acceptable threshold, the response component 1422 can initiate the "first response" countermeasure by increasing the communication priority of the learned network traffic. The comparison analyzer 1420 continues to monitor the network to determine if the rate of traffic from the unknown source reduces to an acceptable rate (e.g., below the threshold) within a predetermined amount of time.

If the rate of traffic from the unknown source continues to exceed the threshold after the predetermined amount of time, the response component can initiate the "second response" countermeasure by applying a rate limiting rule to the unknown source. If rate continues to exceed the threshold a predetermined amount of time after initiating the second countermeasure, the "third response" countermeasure—blocking the unknown source—can be initiated by the response component. By configuring the learning component in this way, the comparison analyzer and the response component can act as a feedback system that seeks to return abnormal network activity to a learned safe pattern through increasingly strong security countermeasures.

Advantageously, the countermeasures enacted by the learning component 1406 are not limited to those that alter network traffic in some way, but can also include countermeasures targeting the equipment and processes comprising the automation system itself. Examples of such industry-specific countermeasures are described with reference to FIG. 16. As in previous examples, learning component 1630 comprises a comparison analyzer 1628 that monitors plant network 1624 and/or one or more automation assets connected thereto in view of one or more learned profiles 1622. When unexpected or corrupt data traffic 1618 is identified by the comparison analyzer 1628 as described above, response component 1626 can generate one or more automated security responses 1616 in accordance with one or more predefined rules 1620. Since the detected security issue has the potential to cause abnormal operation of the assets, the security responses in these examples are targeted to the automation assets themselves, and are intended to mitigate the risk of injury or to protect product integrity during the security alert. For example, the response component 1626 can be configured to instruct a controller 1612 and its associated I/O modules to alter their I/O addressing (e.g., the set of I/O addresses used by the controller and I/O modules to exchange input and output data) in response to specified security issues. This countermeasure can be beneficial if a particular security issue is indicative of a deliberate attempt to remotely hijack the controller and override the controller's program to alter control of the automation system. Another countermeasure can instruct the controller to modify control of a process by switching to a subroutine corresponding to a safe operating mode that minimizes danger to personnel or damage to product. The response component can also cause the controller 1612 to be placed on an alternate VLAN.

If the automation asset is an electric motor 1608 controlled via motor drive 1606, an automated security response from the response component 1626 can, for example, place the motor in a low-speed mode, initiate an emergency stop for the motor, or reconfigure one more parameters of the motor drive in accordance with predetermined settings defined in the rules 1620. Similarly, response component 1626 can be configured, via rules 1620, to alter the operation of an industrial robot on the plant network. This can include placing the robot in a safe operating mode (e.g., slow mode), instructing the robot to return to its home position until otherwise directed, or initiating an emergency stop for the robot. In general, the learning component can be configured to interface remotely with virtually any networked automation asset and to issue instructions to the asset in response to possible security threats that alter the operation of the asset in a manner that reduces or eliminates the potential for hazardous operation.

It is to be appreciated that the learning component described above can also work in conjunction with the security analysis tool in order to ascertain a suitable countermeasure in response to a detected security issue. For example, if the learning component detects a security issue associated with a network vulnerability that had been previously identified by the security analyzer based on the factory description data provided thereto, the learning component can implement a rule or policy that had been recommended by the security analyzer as a countermeasure output.

FIGS. 17-20 illustrate security methodologies in accordance with an aspect the disclosed subject matter. While, for purposes of simplicity of explanation, the methodologies are shown and described as a series of acts, it is to be understood and appreciated that the disclosed subject matter is not limited by the order of acts, as some acts may, in accordance with the disclosed subject matter, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosed subject matter.

Figure 17:
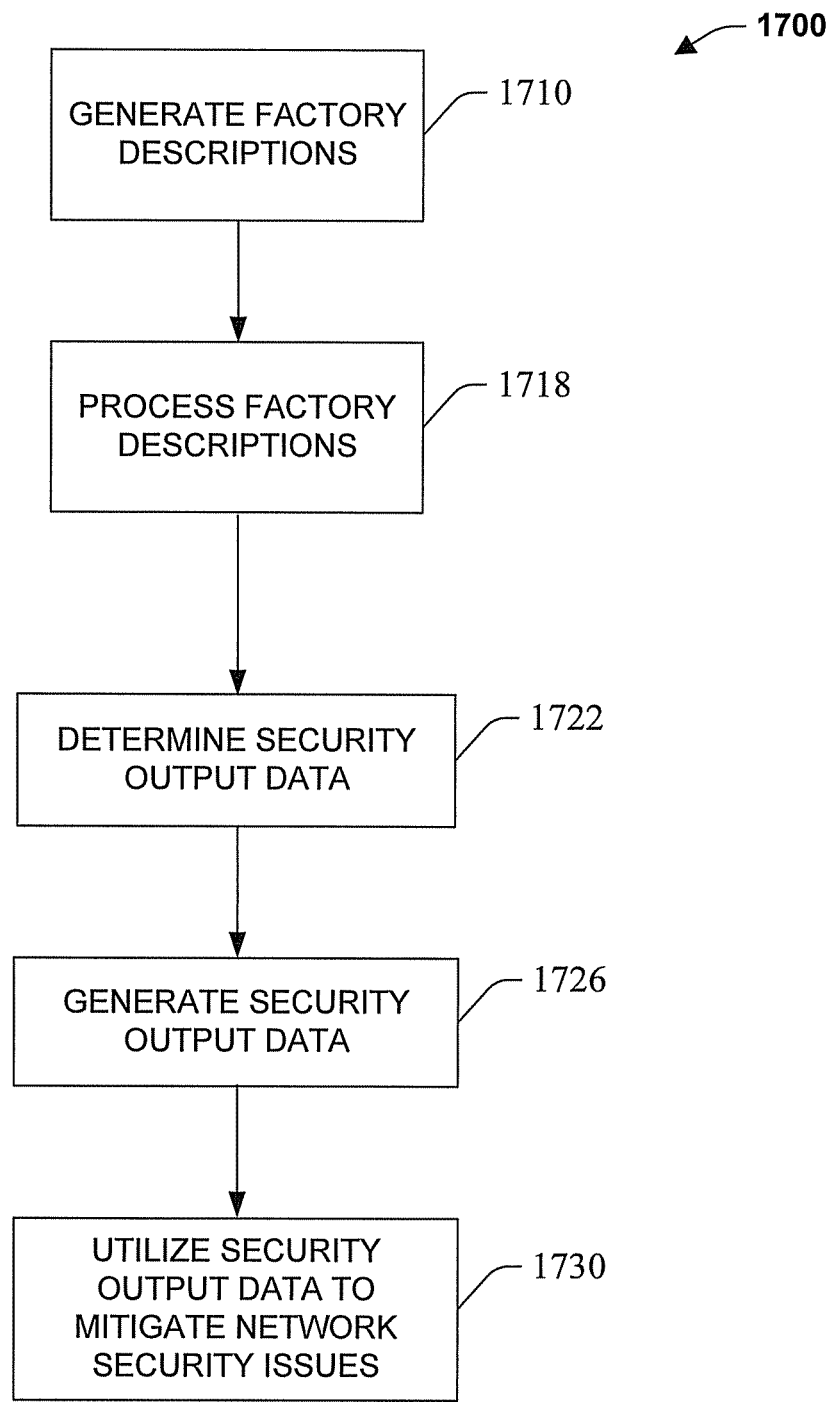
FIG. 17 is a flowchart of an example methodology for processing factory descriptions to generate security output data.

FIG. 17 illustrates a security analysis method 1700 in accordance with an aspect of the disclosed subject matter. Proceeding to 1710, factory descriptions of automation assets, network devices, network topologies, and/or other factory data are generated. Such data can include an abstract description of a factory, models, equations, maps, and network pathways to access the automation assets. The descriptions can also include risk data, cost data, security data from other security tools, and partitioning or user data, for example. At 1718, the factory descriptions are processed such as via an object, application, security engine, ASIC, computer, web service, and so forth.

At 1722, security output data is determined in accordance with the factory descriptions and processing described above. The security output data can include a set or subset of recommended security components, codes, parameters, settings, related interconnection topology, connection configurations, application procedures, security policies, rules, user procedures, and/or user practices, for example, as noted above. At 1726, security output data is generated that can be automatically deployed to one or more entities such as users or devices in order to implement various security measures within an automation environment (e.g., data file or schema generated to automatically configure devices, provide user training and precautions, provide security configurations and topologies). At 1730, when the security output data has been disseminated, entities employ the security data to mitigate network security issues such as unwanted network access and/or network attack.

Figure 18:
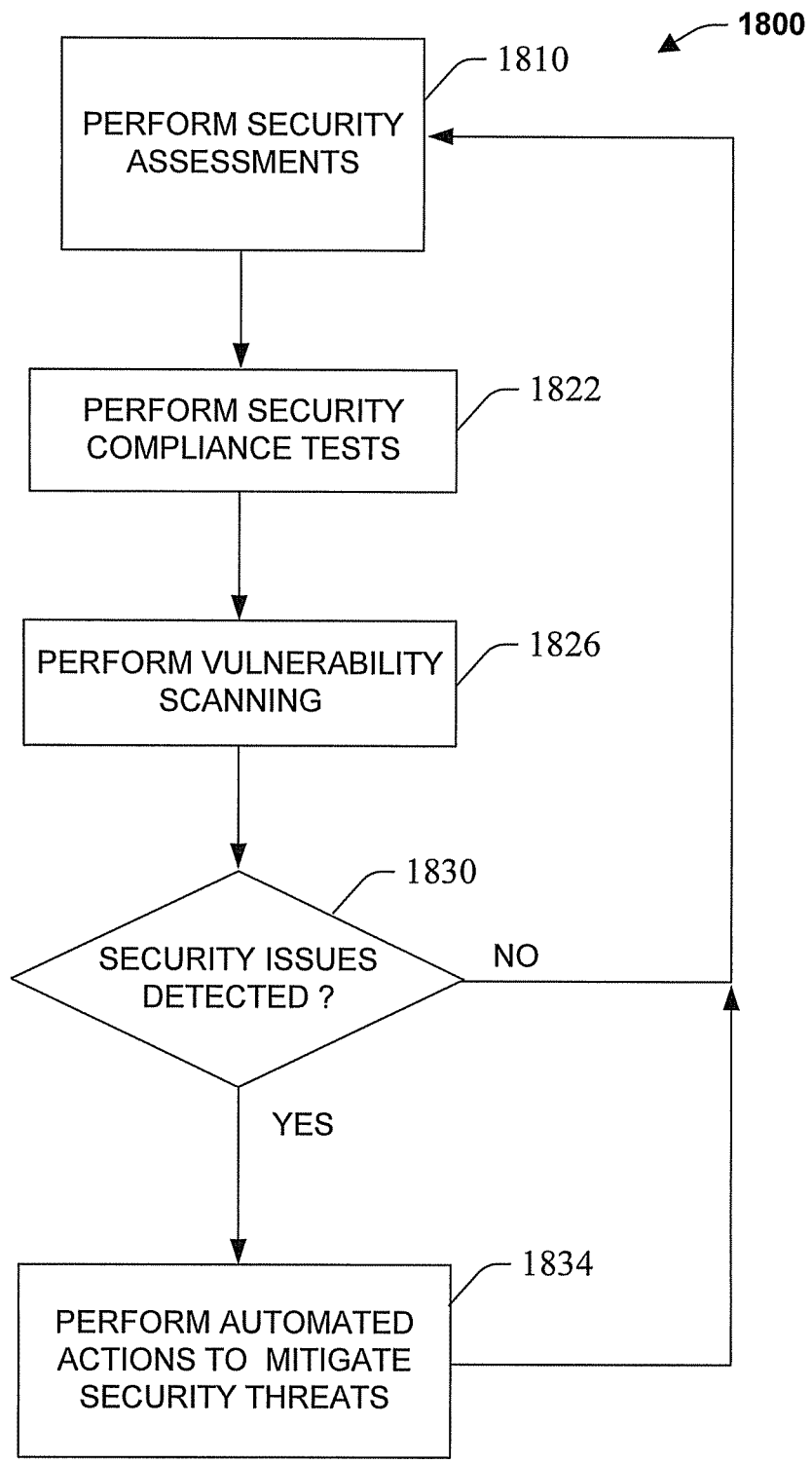
FIG. 18 is a flowchart of an example methodology for performing security assessments on a network.

FIG. 18 illustrates a security validation process 1800 in accordance with an aspect of the disclosed subject matter and includes host-based and/or network based processing as noted above. Proceeding to 1810, security assessments are performed. This can include initial and/or periodic live security assessment of a physical system to identify security flaws or weaknesses. At 1822, security compliance tests are performed. This can include automated checking prior to proposed or attempted network security modifications in order to assess current security levels. Compliance checking can also include determining conformance to other automated security analysis recommendations, conformance to applicable device/network security standards, and/or in accordance with predetermined or factory-specific guidelines, for example.

At 1826, vulnerability scanning and/or auditing on devices/networks is performed. This includes revision checks, improper configuration checks, file system/registry/database permissions checks, user privilege/password and/or account policy checks, checking for susceptibility to common network-based attacks, searching for open network ports, scanning for vulnerable network services, learning identity information about end devices/users that may enable hacker entry, performing vulnerability scanning and auditing on firewalls, routers, and/or other security devices, non-destructively mapping a topology of IT and automation devices, checking revisions and configurations, checking user attributes, and/or checking access control lists. At 1824, a determination is made as to whether security issues have been detected such as in accordance with the assessments, compliance testing, and scanning/auditing described above. If no security issues are detected at 1824, the process proceeds back to 1810. If security issues are detected at 1830, the process proceeds to 1834. At 1834, one or more automated security actions are performed to mitigate security threats. This can include automatically correcting security problems such as automatically adjusting security parameters, altering network traffic patterns, installing new security components, removing suspicious components, triggering alarms, and/or automatically notifying entities about detected problems and/or suspicions. After automated processing at 1834, the process proceeds back to 1810 for further security processing, analysis, scanning, and detection.

Figure 19:
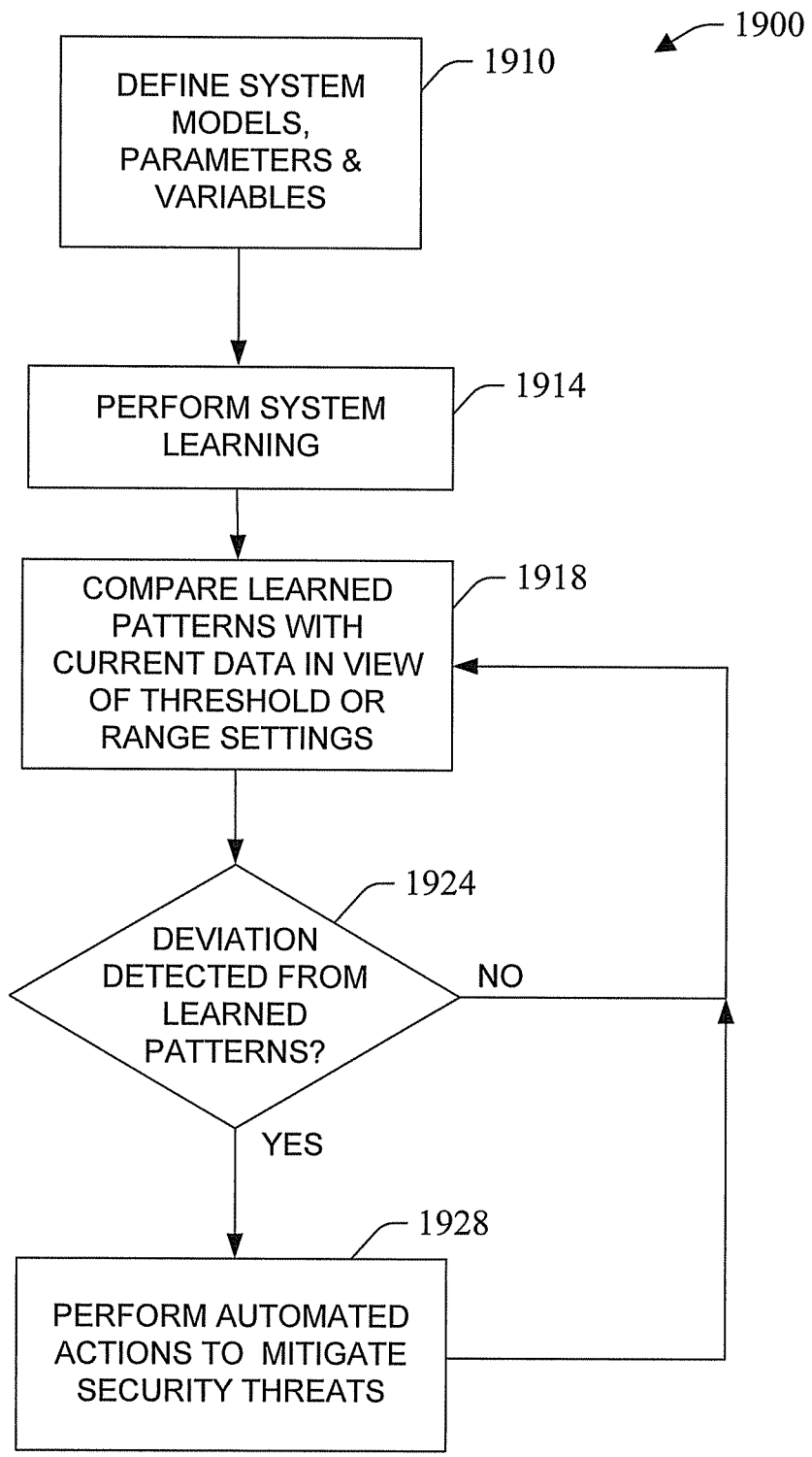
FIG. 19 is a flowchart of an exemplary methodology for security learning and detection processing.

FIG. 19 illustrates a security learning and detection method 1900 in accordance with an aspect of the disclosed subject matter and can also include network-based aspects and/or host-based aspects as noted above. At 1910, one or more learning components such as learning models, learning systems, parameters, and/or variables are defined that describe various network and/or system properties. Such components can be adapted to determine statistical or pattern information regarding network and system activities. This information can include the number, quantity, or average of network requests to and from one or more assets or network devices, the type of requests (e.g., read/write, role/identity of person/system requesting access, time of requests, location of requests), status or counter data (e.g., network access counters, error codes), and/or substantially any data type or pattern that may be retrieved from a network, automation asset, or network device. At 1914, system learning is performed. This includes monitoring an automation network during a predetermined training period, wherein the learning components described above acquire information about network, system, user, and/or device activities during the training period. For example, a counter variable may learn the average number of network requests that are sent to an automation asset in a given time period (can also be other statistical measures than average). In another example, an intelligent component such as a Bayesian inference model, probability determination, or neural network learns patterns such as "During heaviest network loads, the PLC responds to 25% fewer requests, and during real time processing operations, 35% fewer requests for a maximum of 23 requests per minute processed during such periods, +/−1 standard deviation."

After the training period at 1914, learned patterns are compared to current data patterns in view of predetermined threshold or range settings at 1918. For example, if the mean number of factory network packets transmitted is learned to be about 20,000 bytes per/second, +/−5000 bytes, and a range is set up so that if network traffic goes above 26,000 bytes per second or below 10,000 bytes per second, then system security performance is considered acceptable as long as network traffic remains in the selected range. It is noted that thresholds/ranges can be set according to user preferences, automated determinations, and/or according to the amount of risk and/or costs that are deemed acceptable (e.g., for lesser amount of security risk, set thresholds closer to learned patterns).

At 1924, a determination is made as to whether or not deviations were detected from learned data patterns at 1918. If no deviations are detected, the process proceeds back to 1918 for further comparison processing. If deviations are detected at 1924, then one or more automated actions may be performed. Similar to the process described above, this can include automatically correcting security problems such as automatically adjusting security parameters, altering network traffic patterns, installing new security components, removing suspicious components, triggering alarms, and/or automatically notifying entities about detected problems and/or suspicions (e.g., sending an e-mail, alerting a pager, calling a phone number, generating a file, sounding an alarm, interrupting a web session, opening an instant messaging service, and so forth). After automated processing at 1928, the process proceeds back to 1924 for further security processing, comparison, and detection.

Figure 20:
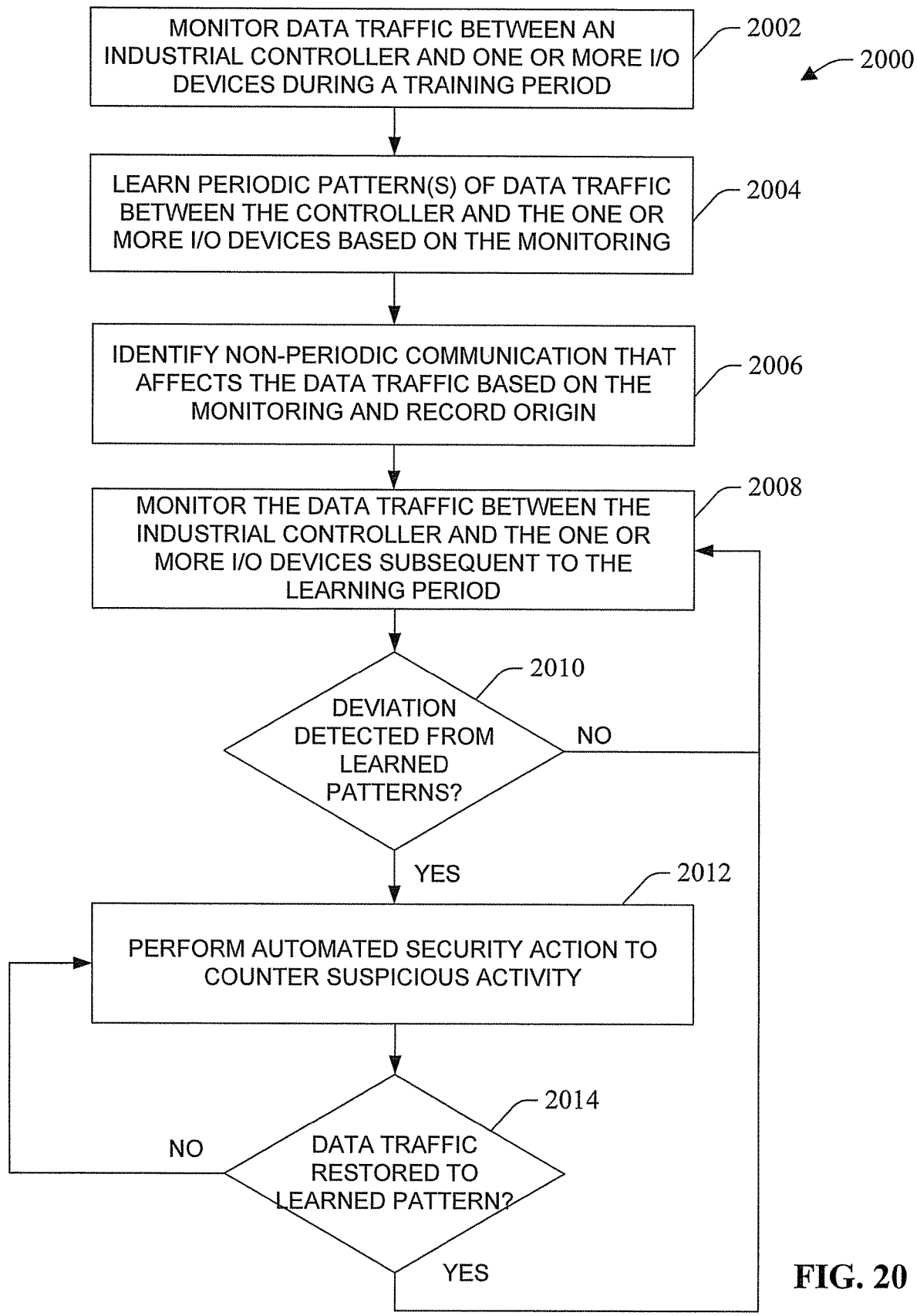
FIG. 20 is a flowchart of an exemplary methodology for detecting and correcting network security issues in an industrial automation environment.

FIG. 20 illustrates another example methodology for detecting and correcting network security issues in an industrial automation environment. At 2002 data traffic between an industrial controller and one or more associated I/O devices is monitored during a training period. This can include, for example, communication between the controller and a networked remote I/O module or a networked automation asset. As noted supra, at least a portion of this data traffic is typically substantially periodic by virtue of the controller's sequence of operations, since the controller performs I/O updates during a designated portion of the sequence. At 2004, a pattern of data traffic between the controller and the one or more I/O devices is learned based on the monitoring performed at step 2002. The learned pattern can identify, for example, the average time interval between I/O updates, an average amount of deviation from this average time interval, times of day when the data traffic alters predictably, or other such information.

At 2006, non-periodic communication that affects data traffic on the network is identified during the training period, and the origin of the non-periodic traffic is noted. This non-periodic communication can include, for example, data access requests originating from an office network communicatively coupled with the plant network (e.g., a production report application that polls the controller for production data), automation assets on the plant network that transmit data in response to detected events, or other such types of communication. In one or more embodiments, the data traffic patterns learned at steps 2004 and 2006 can be encoded in one or more learned profiles that are subsequently used to identify deviations from the learned patterns.

At 2008, data traffic between the industrial controller and the one or more I/O devices is monitored subsequent to the training period. At 2010, a determination is made regarding whether the monitored data traffic deviates from the learned patterns in excess of a threshold. For example, if the I/O updates between the controller and the I/O devices begin occurring at longer intervals than those learned during step 2004, and the amount of deviation exceeds a threshold amount (e.g., a percentage of the average interval), the deviation is noted. Such deviations can be indicative of suspicious network activity that could be the result of unauthorized network access. In one or more embodiments, the threshold can be calculated automatically from the data collected during steps 2002-2006 based in part on observed variations in the data traffic patterns. The threshold can also be manually configured or modified.

If no deviation is detected at 2010, the method returns to step 2008 and continues monitoring the data traffic. Alternatively, if a deviation is detected, an automated security action is performed at 2012 to counter the suspicious activity. According to one or more embodiments, these automated security actions can be predefined by a user, and can include such countermeasures as applying a rate limiting rule to data traffic on a selected portion of the network, placing one or more automation assets on a different VLAN or communication channel, blocking a source of suspicious data traffic, instructing the controller and I/O device to employ an alternate addressing scheme (e.g., re-addressing the I/O between the controller and the I/O points of the device), or other such countermeasures. One or more automated countermeasures can also alter a portion of the automated process being regulated by the control system in order to minimize the risk of injury or product damage as a result of the security breach. Such process-specific countermeasures can include, but are not limited to, instructing industrial equipment (e.g., a motor, an industrial robot, a mixer, a sheet metal stamping press, etc.) to operate in a safe mode until instructed otherwise, stopping or disconnecting power to selected dangerous equipment, instructing the controller to regulate a process according to an alternate "safe" routine until the security issue is resolved, etc.

At 2014, a determination is made regarding whether the data traffic on the plant network has returned to its learned pattern. If the data traffic has returned to an acceptable pattern, the method returns to step 2008 and continues monitoring for deviations. If the data traffic has not been restored to its learned pattern, the method returns to step 2012 and the automated security action is continued, or a secondary security action is performed. The security actions continue to be applied until network activity has been returned to its expected pattern.

Embodiments, systems, and components described herein, as well as industrial control systems and industrial automation environments in which various aspects set forth in the subject specification can be carried out, can include computer or network components such as servers, clients, programmable logic controllers (PLCs), communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC as used herein can include functionality that can be shared across multiple components, systems, and/or networks. As an example, one or more PLCs can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC can also communicate to and control various other devices such as I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet and ControlNet. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 21:
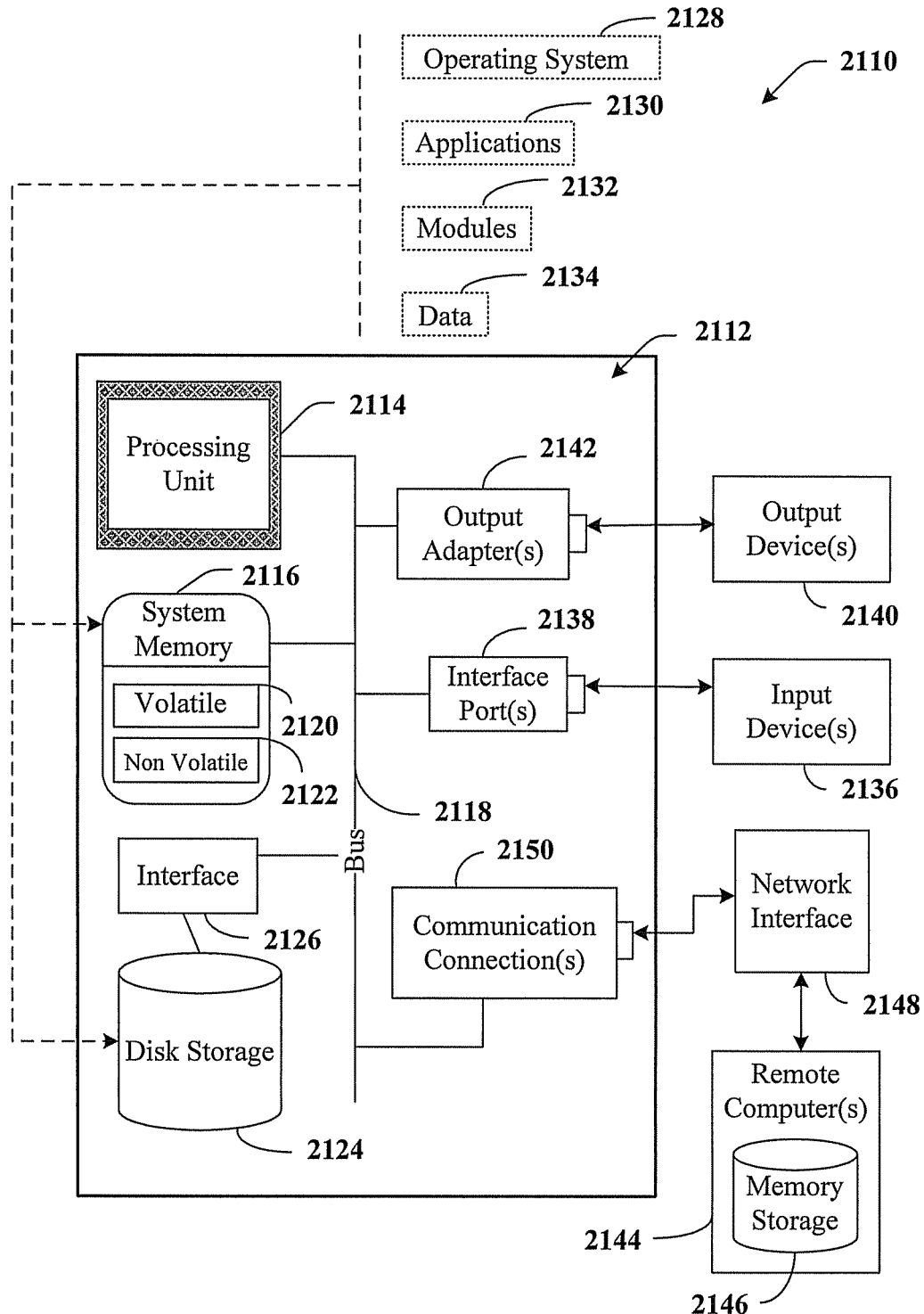
FIG. 21 is an example computing environment.

With reference to FIG. 21, an example environment 2110 for implementing various aspects of the aforementioned subject matter includes a computer 2112. The computer 2112 includes a processing unit 2114, a system memory 2116, and a system bus 2118. The system bus 2118 couples system components including, but not limited to, the system memory 2116 to the processing unit 2114. The processing unit 2114 can be any of various available processors. Dual microprocessors and other multiprocessor architectures also can be employed as the processing unit 2114.

The system bus 2118 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 2116 includes volatile memory 2120 and nonvolatile memory 2122. The basic input/output system (BIOS), containing the basic routines to transfer information between elements within the computer 2112, such as during start-up, is stored in nonvolatile memory 2122. By way of illustration, and not limitation, nonvolatile memory 2122 can include read only memory (ROM), programmable ROM (PROM), electrically programmable ROM (EPROM), electrically erasable PROM (EEPROM), or flash memory. Volatile memory 2120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 2112 also includes removable/non-removable, volatile/non-volatile computer storage media. FIG. 21 illustrates, for example a disk storage 2124. Disk storage 2124 includes, but is not limited to, devices like a magnetic disk drive, floppy disk drive, tape drive, Jaz drive, Zip drive, LS-100 drive, flash memory card, or memory stick. In addition, disk storage 2124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2124 to the system bus 2118, a removable or non-removable interface is typically used such as interface 2126.

It is to be appreciated that FIG. 21 describes software that acts as an intermediary between users and the basic computer resources described in suitable operating environment 2110. Such software includes an operating system 2128. Operating system 2128, which can be stored on disk storage 2124, acts to control and allocate resources of the computer system 2112. System applications 2130 take advantage of the management of resources by operating system 2128 through program modules 2132 and program data 2134 stored either in system memory 2116 or on disk storage 2124. It is to be appreciated that one or more embodiments of the subject disclosure can be implemented with various operating systems or combinations of operating systems.

A user enters commands or information into the computer 2112 through input device(s) 2136. Input devices 2136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2114 through the system bus 2118 via interface port(s) 2138. Interface port(s) 2138 include, for example, a serial port, a parallel port, a game port, and a universal serial bus (USB). Output device(s) 2140 use some of the same type of ports as input device(s) 2136. Thus, for example, a USB port may be used to provide input to computer 2112, and to output information from computer 2112 to an output device 2140. Output adapter 2142 is provided to illustrate that there are some output devices 2140 like monitors, speakers, and printers, among other output devices 2140, which require special adapters. The output adapters 2142 include, by way of illustration and not limitation, video and sound cards that provide a means of connection between the output device 2140 and the system bus 2118. It should be noted that other devices and/or systems of devices provide both input and output capabilities such as remote computer(s) 2144.

Computer 2112 can operate in a networked environment using logical connections to one or more remote computers, such as remote computer(s) 2144. The remote computer(s) 2144 can be a personal computer, a server, a router, a network PC, a workstation, a microprocessor based appliance, a peer device or other common network node and the like, and typically includes many or all of the elements described relative to computer 2112. For purposes of brevity, only a memory storage device 2146 is illustrated with remote computer(s) 2144. Remote computer(s) 2144 is logically connected to computer 2112 through a network interface 2148 and then physically connected via communication connection 2150. Network interface 2148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2150 refers to the hardware/software employed to connect the network interface 2148 to the bus 2118. While communication connection 2150 is shown for illustrative clarity inside computer 2112, it can also be external to computer 2112. The hardware/software necessary for connection to the network interface 2148 includes, for exemplary purposes only, internal and external technologies such as, modems including regular telephone grade modems, cable modems and DSL modems, ISDN adapters, and Ethernet cards.

Figure 22:
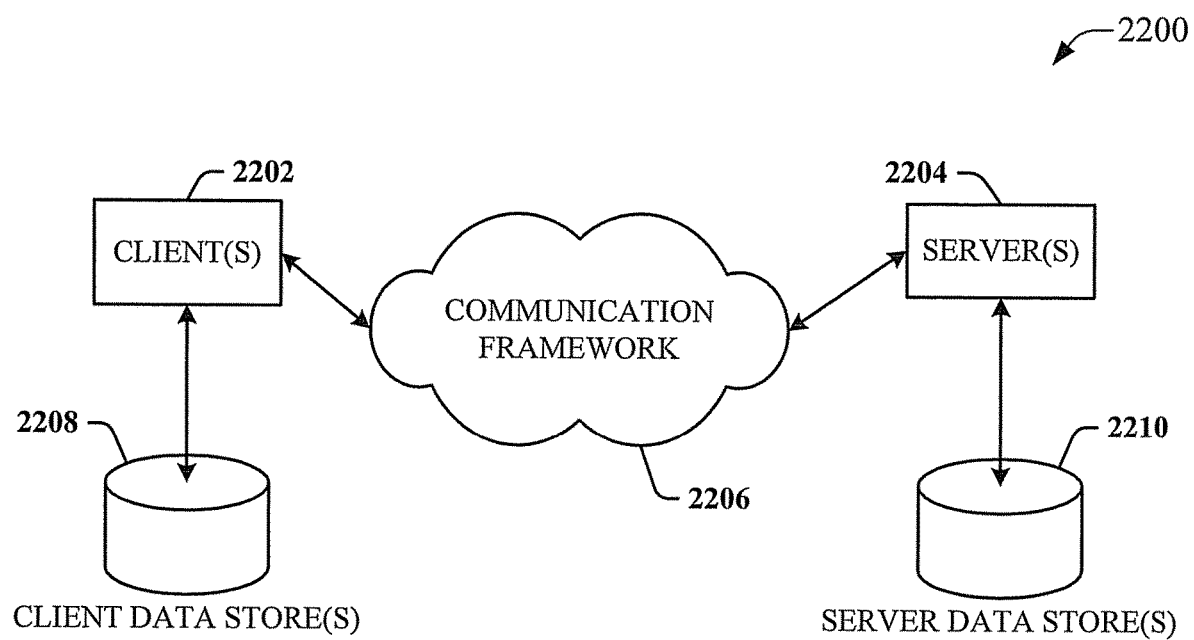
FIG. 22 is an example networking environment.

FIG. 22 is a schematic block diagram of a sample-computing environment 2200 with which the disclosed subject matter can interact. The system 2200 includes one or more client(s) 2210. The client(s) 2210 can be hardware and/or software (e.g., threads, processes, computing devices). The system 2200 also includes one or more server(s) 2230. The server(s) 2230 can also be hardware and/or software (e.g., threads, processes, computing devices). The servers 2230 can house threads to perform transformations by employing one or more embodiments as described herein, for example. One possible communication between a client 2210 and a server 2230 can be in the form of a data packet adapted to be transmitted between two or more computer processes. The system 2200 includes a communication framework 2250 that can be employed to facilitate communications between the client(s) 2210 and the server(s) 2230. The client(s) 2210 are operably connected to one or more client data store(s) 2260 that can be employed to store information local to the client(s) 2210. Similarly, the server(s) 2230 are operably connected to one or more server data store(s) 2240 that can be employed to store information local to the servers 2230.

What has been described above are preferred aspects of the disclosed subject matter. It is, of course, not possible to describe every conceivable combination of components or methodologies for purposes of describing the disclosed subject matter, but one of ordinary skill in the art will recognize that many further combinations and permutations of the disclosed subject matter are possible. Accordingly, the disclosed subject matter is intended to embrace all such alterations, modifications and variations that fall within the spirit and scope of the appended claims.

What is claimed is:

1. A system, comprising:
a pattern analysis component that generates at least one profile characterizing at least one pattern of data traffic determined based at least in part on data traffic information obtained by monitoring the data traffic associated with an industrial network; and
a comparison analyzer component that detects a deviation of a pattern of the data traffic from the at least one pattern of data traffic in excess of a defined threshold of deviation, and initiates one or more security countermeasures in response to the detection of the deviation.

2. The system of claim 1, further comprising a pattern monitoring component that monitors the data traffic associated with the industrial network.

3. The system of claim 2, wherein the pattern monitoring component monitors the data traffic between an industrial controller and one or more input/output (I/O) modules, wherein the pattern analysis component determines an average cycle time of data transfers between the industrial controller and the one or more I/O modules, and wherein the at least one pattern of data traffic comprises the average cycle time of the data transfers.

4. The system of claim 2, further comprising a learning component, wherein the pattern analysis component assesses respective patterns of data traffic for respective segments of the industrial network, and wherein the learning component determines respective industrial assets that correspond with the respective segments of the industrial network based at least in part on description information that relates to the industrial network.

5. The system of claim 4, wherein the pattern monitoring component determines a monitoring process to employ to respectively monitor respective portions of the data traffic associated with the respective segments of the industrial network based at least in part on the respective patterns of data traffic and the correspondence between the respective industrial assets and the respective segments of the industrial network.

6. The system of claim 2, wherein the pattern analysis component determines the defined threshold of deviation based at least in part on cycle time variations of data transfers observed by the pattern monitoring component, and encodes the defined threshold of deviation in the at least one profile.

7. The system of claim 6, wherein the pattern analysis component determines respective defined thresholds of deviation associated with respective time periods as a function of a time a day, based at least in part on respective cycle time variations of data transfers observed by the pattern monitoring component during the respective time periods, and encodes the respective defined thresholds of deviation in the at least one profile, and wherein the respective defined thresholds of deviation comprise the defined threshold of deviation associated with a first time of day and at least one other defined threshold of deviation associated with at least one other time of day.

8. The system of claim 2, wherein the pattern monitoring component monitors at least one network statistic associated with at least one automation asset that is associated with the industrial network during a defined time period, and wherein the pattern analysis component determines a pattern of network activity for the at least one automation asset, based at least in part on the at least one network statistic, and records the pattern of the network activity in the at least one profile.

9. The system of claim 8, wherein the at least one network statistic comprises at least one of a number of network connection retry attempts performed by the at least one automation asset, a number of access requests received by the at least one automation asset, a type of access request received by the at least one automation asset, an error code associated with the at least one automation asset, a number of times an industrial controller is forced to re-open a connection to an input/output (I/O) module or to another industrial controller, a number of unrecognized messages received by the industrial controller or the I/O module, a number of connections opened to the I/O module, an instance of a device closing a first connection to a first source and opening a second connection to a second source, or a number of packets on the network that alter inputs or outputs associated with the industrial controller.

10. The system of claim 1, wherein the one or more security countermeasures comprise at least one of blocking an unlearned, unknown, or unauthorized source of the data traffic detected by the comparison analyzer component, applying a rate limiting rule to unlearned or unknown data traffic detected by the comparison analyzer component, increasing a priority of at least a portion of the data traffic relative to the unlearned or unknown data traffic, instructing at least one automation asset associated with the industrial network to use an alternate communication channel for data communication, instructing an industrial controller and one or more input/output (I/O) modules to employ an alternate addressing for exchange of input data and output data, switching between a wireless communication channel and a wired communication channel, changing a virtual local area network number for a group of assets, instructing the industrial controller to execute an alternative control routine, instructing the at least one automation asset to operate in a safe mode, initiating an emergency stop of the at least one automation asset, or instructing the at least one automation asset to move to a defined home position.

11. The system of claim 1, further comprising a response component determines the one or more security countermeasures in response to the deviation in accordance with one or more rules defining an association between the one or more security countermeasures and the deviation, and applies the one or more security countermeasures at least until the deviation is determined to be mitigated.

12. A method, comprising:
generating, by a system comprising a processor, at least one profile comprising at least one data traffic pattern determined based at least in part on data traffic information relating to data traffic associated with an industrial automation network that is monitored; and
identifying, by the system, a deviation of other data traffic associated with the industrial automation network from the at least one data traffic pattern in excess of a defined threshold of deviation to facilitate mitigating the deviation.

13. The method of claim 12, further comprising:
generating, by the system, at least one asset activity profile characterizing at least one pattern of asset activity of at least one automation asset that is determined based at least in part on asset activity information obtained by monitoring at least the at least one automation asset; and
identifying, by the system, another deviation of other asset activity associated with the at least one automation asset from the at least one pattern of asset activity in excess of a defined threshold of deviation of asset activity to facilitate mitigating the other deviation of the other asset activity.

14. The method of claim 12, further comprising:
monitoring, by the system, the data traffic associated with the industrial automation network to obtain the data traffic information to facilitate generating the at least one profile.

15. The method of claim 14, wherein the monitoring further comprises monitoring a subset of the data traffic communicated between an industrial controller and one or more input/output (I/O) modules of the industrial automation network, and wherein the method further comprises:
determining, by the system, respective average cycle times of data transfers between the industrial controller and the one or more I/O modules over time based at least in part on the subset of the data traffic; and
determining, by the system, a set of defined thresholds of deviation, comprising the defined threshold of deviation and at least one other defined threshold of deviation, based at least in part on variations in the respective average cycle times of the data transfers during respective time periods.

16. The method of claim 15, wherein the defined threshold of deviation is associated with a first time period of a day of the respective time periods and the at least one other defined threshold of deviation is associated with a second time period of the day of the respective time periods, and wherein the method further comprises:
applying, by the system, the defined threshold of deviation with respect to first data transfers between the industrial controller and the one or more I/O modules during the first time period of the day; and changing, by the system, the defined threshold of deviation to the at least one other defined threshold of deviation to apply the at least one other defined threshold of deviation with respect to second data transfers between the industrial controller and the one or more I/O modules during the second time period of the day.

17. The method of claim 12, further comprising:
detecting, by the system, a difference in a number of data transfers between devices of the industrial automation network that occur during a particular time of day on particular days of a week relative to another number of other data transfers between the devices that occur during other times of the day on other days of the week;
recording, by the system, information relating to the difference in the number of data transfers between the devices during the particular time of day on the particular days of the week in the at least one profile; and
based at least in part on the difference in the number of data transfers between the devices during the particular time of day on the particular days of the week, determining, by the system, a particular defined threshold level of deviation relating to data transfers that is to be used during the particular time of day on the particular days of the week.

18. The method of claim 12, further comprising:
initiating, by the system, one or more security countermeasures in response to the identifying of the deviation, wherein the initiating the one or more security countermeasures comprises at least one of blocking an unlearned, unknown, or unauthorized source of the data traffic, applying a rate limiting rule to unlearned or unknown data traffic, increasing a priority of at least a portion of the other data traffic relative to the unlearned or unknown data traffic, instructing at least one automation asset to use an alternate communication channel for data communication, instructing at least one of an industrial controller or an input/output (I/O) module to change from a first I/O addressing scheme to a second I/O addressing scheme, instructing the industrial controller to execute an alternative control program, instructing the at least one automation asset to operate in a safe operation mode, initiating an emergency stop of the at least one automation asset, or instructing the at least one automation asset to move to a defined safe position.

19. A non-transitory computer-readable medium storing computer-executable instructions that, in response to execution, cause a system comprising a processor to perform operations, comprising:
creating at least one data traffic profile characterizing at least one pattern of data traffic based at least in part on data traffic information relating to data traffic associated with an industrial automation network that is monitored; and
identifying a deviation of second data traffic associated with the industrial automation network from the at least one data traffic pattern that breaches a defined threshold of deviation to facilitate reducing the deviation using at least one security countermeasure.

20. The non-transitory computer-readable medium of claim 19, wherein the operations further comprise:
in response to the identifying the deviation, implementing the at least one security countermeasure in connection with the industrial automation network to reduce the deviation.

* * * * *